(12) United States Patent
Amaya et al.

(10) Patent No.: US 10,500,791 B2
(45) Date of Patent: Dec. 10, 2019

(54) THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

(71) Applicant: TECHNOLOGY RESEARCH ASSOCIATION FOR FUTURE ADDITIVE MANUFACTURING, Tokyo (JP)

(72) Inventors: Koichi Amaya, Fukui (JP); Tetsushi Midorikawa, Fukui (JP); Takeshi Yamada, Fukui (JP)

(73) Assignee: TECHNOLOGY RESEACH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 274 days.

(21) Appl. No.: 15/125,104

(22) PCT Filed: Mar. 9, 2016

(86) PCT No.: PCT/JP2016/057434
§ 371 (c)(1),
(2) Date: Sep. 9, 2016

(87) PCT Pub. No.: WO2017/154148
PCT Pub. Date: Sep. 14, 2017

(65) Prior Publication Data
US 2018/0085999 A1    Mar. 29, 2018

(51) Int. Cl.
*B29C 64/393* (2017.01)
*B29C 64/214* (2017.01)
(Continued)

(52) U.S. Cl.
CPC ............ *B29C 64/393* (2017.08); *B22F 3/105* (2013.01); *B22F 3/1055* (2013.01); *B22F 3/16* (2013.01);
(Continued)

(58) Field of Classification Search
CPC . B22F 3/105; B22F 3/16; B29C 64/10; B29C 64/214; B29C 64/264; B29C 64/393; B33Y 10/00; B33Y 30/00; B33Y 50/00
See application file for complete search history.

(56) References Cited

U.S. PATENT DOCUMENTS 7,635,825 B2    12/2009  Larsson
2006/0108712 A1  5/2006  Mattes
(Continued)

FOREIGN PATENT DOCUMENTS

EP    2 221 132 A1   8/2010
JP    4639087 B2    12/2010
(Continued)

OTHER PUBLICATIONS

International Search Report (ISR) dated Jun. 7, 2016 for International Application No. PCT/JP2016/057434.
(Continued)

*Primary Examiner* — Christopher E. Everett
*Assistant Examiner* — Chad G Erdman
(74) *Attorney, Agent, or Firm* — Ladas & Parry LLP

(57) ABSTRACT

A system of this invention is a three-dimensional laminating and fabricating system that suppresses, in advance, a squeezing blade from getting caught on a surface of a laminated and fabricated object. The three-dimensional laminating and fabricating system includes a laminating and fabricating unit that includes a squeezing blade configured to spread a laminating material on an upper layer of a laminated and fabricated object, and an irradiator configured to irradiate the
(Continued)

laminating material, and fabricates each layer of the laminated and fabricated object as an aggregate of cell regions, and a laminating and fabricating controller that controls the laminating and fabricating unit such that a scanning direction in which the irradiator irradiates the laminating material in the cell region changes with respect to a moving direction of the squeezing blade during laminating and fabricating.

12 Claims, 31 Drawing Sheets

(51) Int. Cl.
| | |
|---|---|
| *B29C 64/264* | (2017.01) |
| *B29C 64/10* | (2017.01) |
| *B22F 3/105* | (2006.01) |
| *B22F 3/16* | (2006.01) |
| *G05B 19/4099* | (2006.01) |
| *B29C 64/153* | (2017.01) |
| *B33Y 10/00* | (2015.01) |
| *B33Y 30/00* | (2015.01) |
| *B33Y 50/00* | (2015.01) |
| *B33Y 50/02* | (2015.01) |
| *B33Y 40/00* | (2015.01) |

(52) U.S. Cl.
CPC ............ *B29C 64/10* (2017.08); *B29C 64/153* (2017.08); *B29C 64/214* (2017.08); *B29C 64/264* (2017.08); *G05B 19/4099* (2013.01); *B22F 2003/1057* (2013.01); *B33Y 10/00* (2014.12); *B33Y 30/00* (2014.12); *B33Y 40/00* (2014.12); *B33Y 50/00* (2014.12); *B33Y 50/02* (2014.12); *Y02P 10/295* (2015.11)

(56) References Cited

U.S. PATENT DOCUMENTS

| | | | |
|---|---|---|---|
| 2008/0157412 A1* | 7/2008 | Kihara | B33Y 30/00 264/1.1 |
| 2008/0241392 A1 | 10/2008 | Dimter et al. | |
| 2010/0233012 A1 | 9/2010 | Higashi et al. | |
| 2014/0154088 A1 | 6/2014 | Etter et al. | |
| 2014/0242400 A1 | 8/2014 | Hoebel et al. | |
| 2014/0301883 A1 | 10/2014 | Wiesner et al. | |
| 2015/0017434 A1* | 1/2015 | Dronen | H01L 21/6835 428/352 |
| 2015/0115490 A1 | 4/2015 | Reinarz | |
| 2015/0165524 A1* | 6/2015 | Ljungblad | B22F 3/008 419/53 |
| 2015/0183165 A1* | 7/2015 | Abe | B22F 3/105 264/497 |
| 2015/0283761 A1* | 10/2015 | Maeda | B33Y 10/00 264/408 |
| 2016/0067820 A1* | 3/2016 | Mironets | B23K 26/0648 419/7 |
| 2016/0107233 A1* | 4/2016 | Kobayashi | B29C 64/153 425/78 |
| 2016/0151975 A1* | 6/2016 | Hara | B29C 67/0059 264/255 |
| 2016/0167300 A1* | 6/2016 | Davies | B29C 67/0059 428/336 |
| 2016/0250877 A1* | 9/2016 | Schlatterbeck | B05D 5/02 428/144 |
| 2016/0318128 A1* | 11/2016 | Dutton | B23K 26/14 |
| 2016/0368053 A1* | 12/2016 | Kamakura | B22F 3/1055 |
| 2017/0066052 A1* | 3/2017 | Abe | B33Y 30/00 |
| 2017/0136695 A1* | 5/2017 | Versluys | B33Y 10/00 |
| 2017/0165792 A1 | 5/2017 | Buller et al. | |
| 2017/0165751 A1 | 6/2017 | Buller et al. | |
| 2017/0165752 A1 | 6/2017 | Buller et al. | |
| 2017/0165753 A1 | 6/2017 | Buller et al. | |
| 2017/0165754 A1 | 6/2017 | Buller et al. | |
| 2017/0190113 A1* | 7/2017 | Calefati | B33Y 30/00 |
| 2017/0197229 A1* | 7/2017 | Martensson | B05B 13/04 |
| 2017/0266728 A1* | 9/2017 | Johnson | B33Y 10/00 |
| 2017/0266889 A1* | 9/2017 | Takahashi | B33Y 10/00 |
| 2017/0304946 A1* | 10/2017 | Shibazaki | B23K 26/342 |
| 2018/0043432 A1* | 2/2018 | Domrose | B22F 3/1055 |

FOREIGN PATENT DOCUMENTS

| | | |
|---|---|---|
| JP | 2014-129597 A | 7/2014 |
| JP | 2014-169500 A | 9/2014 |
| JP | 2014-201068 A | 10/2014 |
| WO | 2004/056509 A1 | 7/2004 |
| WO | 2008/116518 A1 | 10/2008 |
| WO | 2017/100695 A1 | 6/2017 |

OTHER PUBLICATIONS

Written Opinion (WO) dated Jun. 7, 2016 for International Application No. PCT/JP2016/057434.
J-PlatPat English abstract of JP 2014-201068 A.
J-PlatPat English abstract of JP 2014-129597 A.
J-PlatPat English abstract of JP 2014-169500 A.
European Search Report (ESR) dated Mar. 26, 2018 in connection with corresponding European Application No. 16 82 3145.4.
Rishi Kumar Ganeriwala, "Multiphysics Modeling of Selective Laser Sintering/Melting," Jan. 1, 2015, 139 pages, Graduate Division of the University of California, Berkeley, URL:http://digitalassets.lib.berkeley.edu/etd/ucb/text/Ganeriwala_berkeley_0028E_15669.pdf.

\* cited by examiner

| ID OF THREE-DIMENSIONAL FABRICATING DATA | LAMINATING AND FABRICATING CONDITION | | | SELECTED SCANNING DIRECTION | |
|---|---|---|---|---|---|
| | MATERIAL CONDITION | FABRICATING CONDITION | ... | CELL SHAPE CHANGE PATTERN | CELL SCANNING DIRECTION CHANGE PATTERN |
| | | | | NO CHANGE (□) | |
| | | | | NO CHANGE (◇) | |
| | | | | □↔◇ | |
| ... | | | | | |

| ID OF THREE-DIMENSIONAL FABRICATING DATA (701) | LAMINATING AND FABRICATING CONDITION (702) | | | LAYER COUNT TO CHANGE SCANNING DIRECTION (1304) | SELECTED SCANNING DIRECTION (ON LAYER COUNT BASIS) (1303) | | |
|---|---|---|---|---|---|---|---|
| | MATERIAL CONDITION | FABRICATING CONDITION | ... | | CELL SHAPE CHANGE PATTERN | CELL SCANNING DIRECTION CHANGE PATTERN | ... |
| | | | | | NO CHANGE (□) | | |
| | | | | | NO CHANGE (◇) | | |
| ... | | | | | | | |

1300

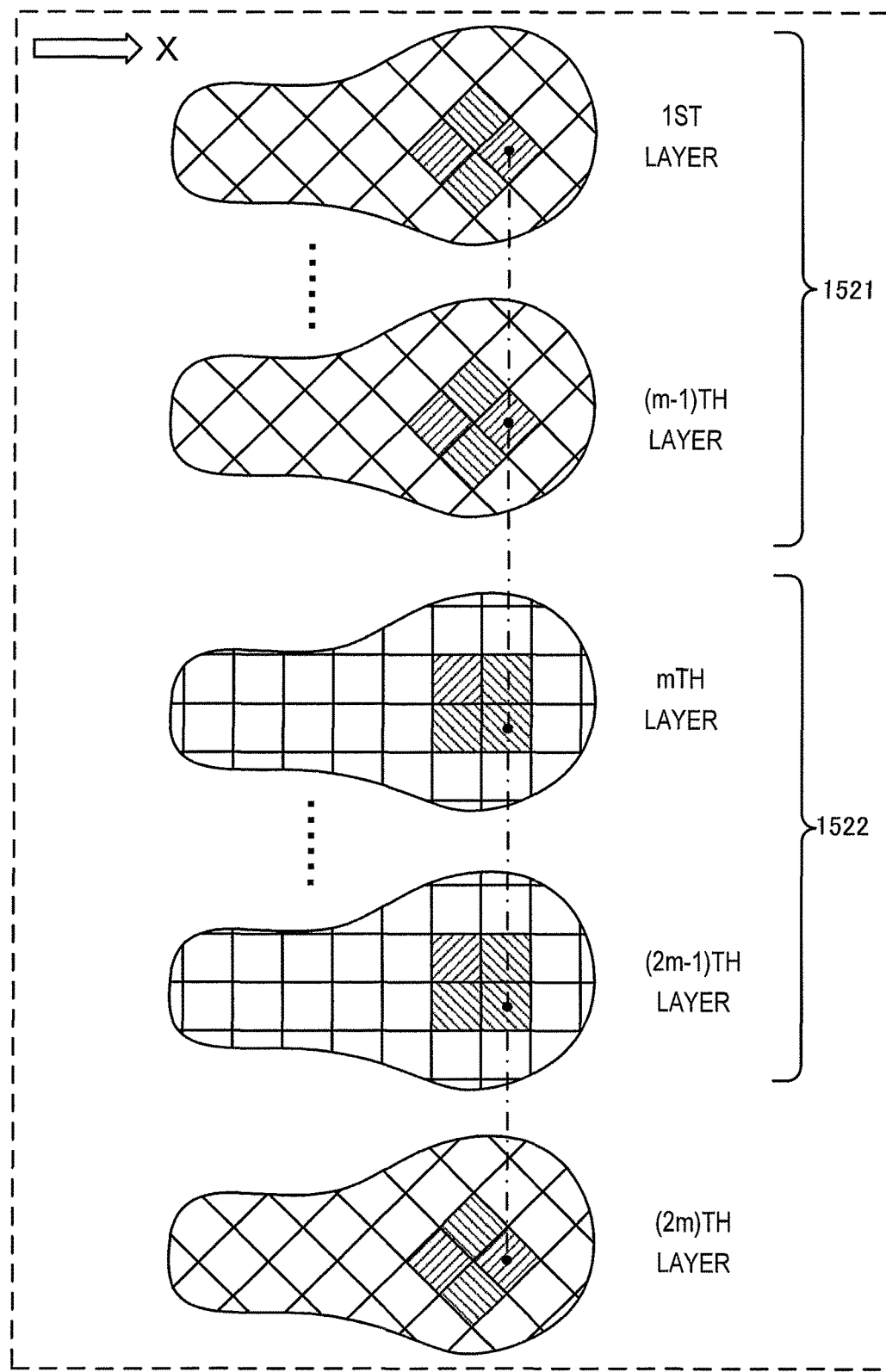
F I G. 15B

FIG. 17

| ID OF THREE-DIMENSIONAL FABRICATING DATA | LAMINATING AND FABRICATING CONDITION | | LAYER COUNT TO CHANGE CELL SHAPE | SELECTED CELL SHAPE (ON LAYER COUNT BASIS) | |
|---|---|---|---|---|---|
| | MATERIAL CONDITION | FABRICATING CONDITION ... | | CELL SHAPE CHANGE PATTERN | CELL POSITION CHANGE PATTERN ... |
| | | | | | |
| | | | | | |
| ... | | | | | |

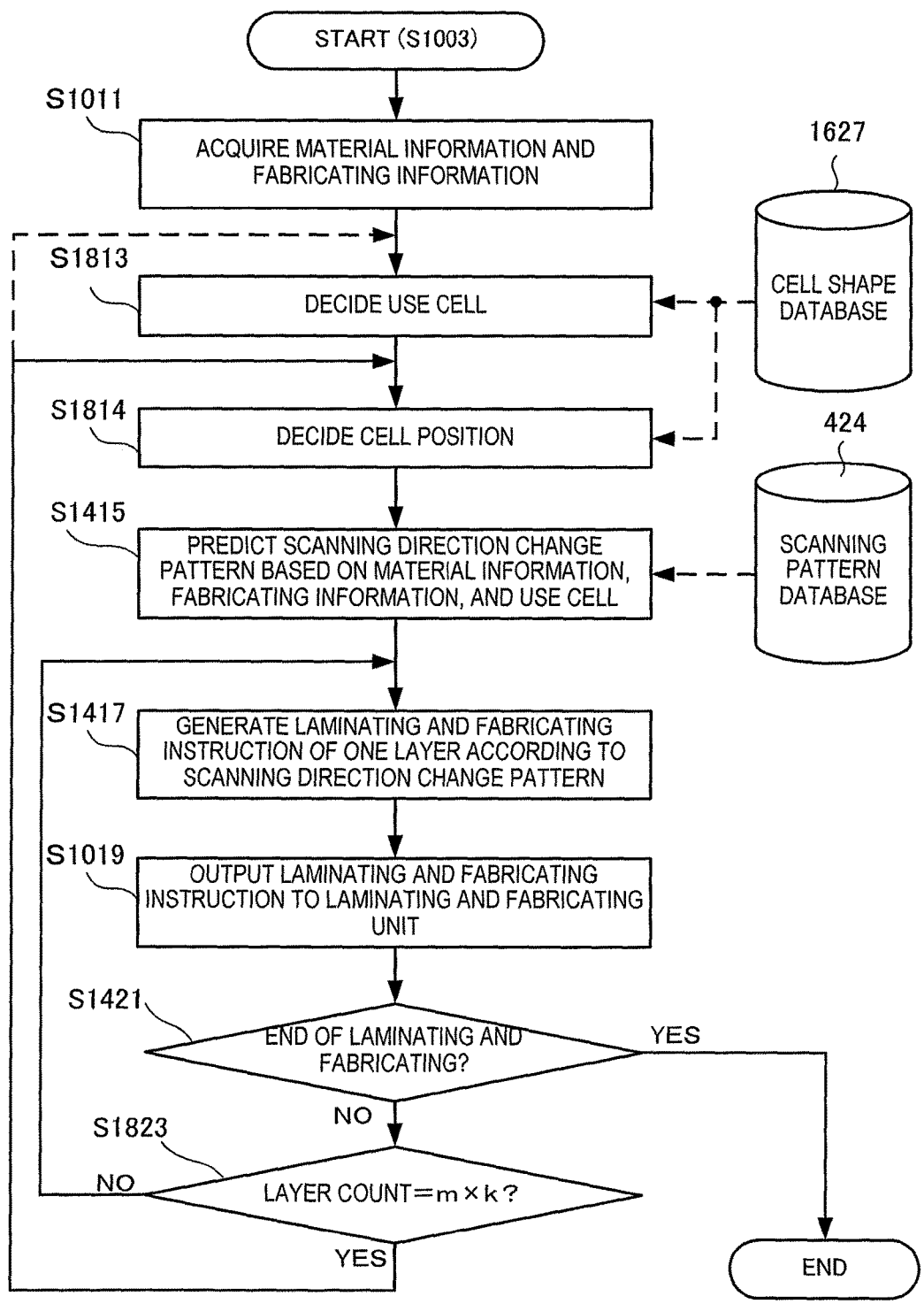
F I G. 18

FIG. 22

| ID OF THREE-DIMENSIONAL FABRICATING DATA | LAMINATING AND FABRICATING CONDITION | | | SCANNING DIRECTION AT TIME OF OVERLOAD | | |
|---|---|---|---|---|---|---|
| | MATERIAL CONDITION | FABRICATING CONDITION | ... | LOAD > α | | |
| | | | | CELL SHAPE CHANGE PATTERN | CELL SCANNING DIRECTION CHANGE PATTERN | ... |
| | | | | | | |
| | | | | | | |
| | | | | | | |
| ... | | | | | | |

THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

RELATED APPLICATION

This application is an application under 35 U.S.C. 371 of International Application No. PCT/JP2016/057434 filed on Mar. 9, 2016, the entire contents of which are incorporated herein by reference.

TECHNICAL FIELD

The present invention relates to a technique of controlling a scanning direction in three-dimensional laminating and fabricating.

BACKGROUND ART

In the above technical field, patent literature 1 discloses a technique of dividing a laminated and fabricated object into rectangular regions and irradiating the rectangular regions according to different scanning patterns. Patent literature 2 discloses a technique of performing scanning obliquely at 45° with respect to a gas flow of SLM and changing the scanning direction on a layer basis so as to suppress deformation of a laminated and fabricated object caused by thermal contraction.

CITATION LIST

Patent Literature

Patent literature 1: Japanese Patent No. 4639087
Patent literature 2: Japanese Patent Laid-Open No. 2014-201068

SUMMARY OF THE INVENTION

Technical Problem

In the techniques described in the above literatures, however, a phenomenon that a squeegeeing blade configured to spread a laminating material on the upper layer of a laminated and fabricated object gets caught on a surface of the laminated and fabricated object is not taken into consideration. It is therefore impossible to suppress, in advance, the squeegeeing blade from getting caught on a surface of the laminated and fabricated object. The only one measure to prevent laminating and fabricating from being interrupted is post-processing of, for example, shaving the upper layer of the fabricated object.

The present invention enables to provide a technique of solving the above-described problem.

Solution to Problem

One aspect of the present invention provides a three-dimensional laminating and fabricating system comprising:
a laminating and fabricating unit that includes a squeegeeing blade configured to spread a laminating material on an upper layer of a laminated and fabricated object, and an irradiator configured to irradiate the laminating material, said laminating and fabricating unit fabricating each layer of the laminated and fabricated object as an aggregate of cell regions; and
a laminating and fabricating controller that controls said laminating and fabricating unit such that a scanning direction in which said irradiator irradiates the laminating material in each of the cell regions changes with respect to a moving direction of said squeegeeing blade during laminating and fabricating.

Another aspect of the present invention provides a method of three-dimensional laminating and fabricating, comprising:
fabricating each layer of a laminated and fabricated object as an aggregate of cell regions, using a laminating and fabricating unit that includes a squeegeeing blade configured to spread a laminating material on an upper layer of the laminated and fabricated object, and an irradiator configured to irradiate the laminating material; and
controlling the laminating and fabricating unit such that a scanning direction in which the irradiator irradiates the laminating material in each of the cell regions changes with respect to a moving direction of the squeegeeing blade during laminating and fabricating.

Still other aspect of the present invention provides a laminating and fabricating control apparatus comprising:
a data acquirer that acquires data of a laminated and fabricated object as a target of laminating and fabricating; and
a scanning direction controller that controls, based on the data of the laminated and fabricated object, a laminating and fabricating unit fabricating each layer of the laminated and fabricated object as an aggregate of cell regions such that a scanning direction in which a laminating material in each of the cell regions is irradiated changes, during laminating and fabricating, with respect to a moving direction of a squeegeeing blade configured to spread the laminating material on an upper layer of the laminated and fabricated object.

Yet other aspect of the present invention provides a method of controlling a laminating and fabricating control apparatus, comprising:
acquiring data of a laminated and fabricated object as a target of laminating and fabricating; and
controlling, based on the data of the laminated and fabricated object, a laminating and fabricating unit fabricating each layer of the laminated and fabricated object as an aggregate of cell regions, such that a scanning direction in which a laminating material in each of the cell regions is irradiated changes, during laminating and fabricating, with respect to a moving direction of a squeegeeing blade configured to spread the laminating material on an upper layer of the laminated and fabricated object.

Yet other aspect of the present invention provides a control program of a laminating and fabricating control apparatus, which causes a computer to execute a method, comprising:
acquiring data of a laminated and fabricated object as a target of laminating and fabricating; and
controlling, based on the data of the laminated and fabricated object, a laminating and fabricating unit fabricating each layer of the laminated and fabricated object as an aggregate of cell regions, such that a scanning direction in which a laminating material in each of the cell regions is irradiated changes, during laminating and fabricating, with respect to a moving direction of a squeegeeing blade configured to spread the laminating material on an upper layer of the laminated and fabricated object.

Advantageous Effects of Invention

According to the present invention, it is possible to suppress, in advance, a squeegeeing blade from getting caught on a surface of a laminated and fabricated object.

BRIEF DESCRIPTION OF THE DRAWINGS

FIG. 7 is a view showing the arrangement of a scanning direction selection table according to the second embodiment of the present invention;

FIG. 13 is a view showing the arrangement of a scanning direction selection table according to the third embodiment of the present invention;

FIG. 15B is a conceptual view showing another fabricating state by the three-dimensional laminating and fabricating system according to the fourth embodiment of the present invention;

FIG. 17 is a view showing the arrangement of a cell shape decision table according to the fourth embodiment of the present invention;

FIG. 18 is a flowchart showing the procedure of laminating and fabricating instruction generation processing according to the fourth embodiment of the present invention;

FIG. 22 is a view showing the arrangement of a scanning direction selection table according to the fifth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. A term "cell region" used in this specification indicates a region obtained by dividing the fabricating region of each layer into tiny regions in three-dimensional laminating and fabricating (for example, a 0.1-mm square rectangle). A three-dimensional laminating and fabricating system according to each embodiment irradiates the cell regions according to various scanning patterns, thereby implementing fabricating of each layer as an aggregate of cell regions.

[First Embodiment]

A three-dimensional laminating and fabricating system 100 according to the first embodiment of the present invention will be described with reference to FIG. 1. The three-dimensional laminating and fabricating system 100 is a system that performs three-dimensional laminating and fabricating by irradiating a laminating material.

Figure 1:
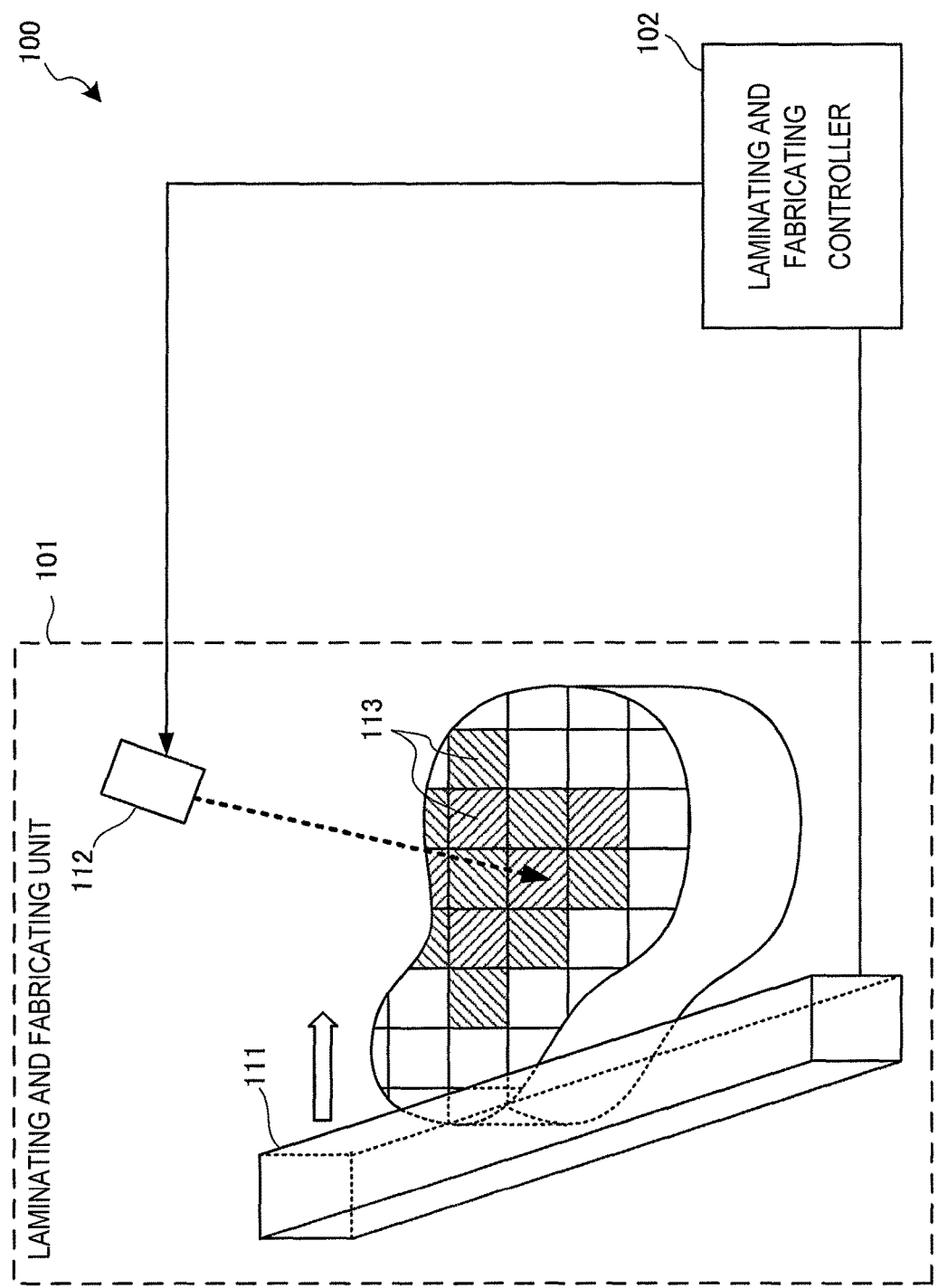
FIG. 1 is a block diagram showing the arrangement of a three-dimensional laminating and fabricating system according to the first embodiment of the present invention.

As shown in FIG. 1, the three-dimensional laminating and fabricating system 100 includes a laminating and fabricating unit 101 and a laminating and fabricating controller 102. The laminating and fabricating unit 101 includes a squeegeeing blade 111 configured to spread a laminating material on the upper layer of a laminated and fabricated object, and an irradiator 112 configured to irradiate the laminating material, and fabricates each layer of the laminated and fabricated object as an aggregate of cell regions 113. The laminating and fabricating controller 102 controls the laminating and fabricating unit 101 such that the scanning direction in which the irradiator 112 irradiates the laminating material in the cell region 113 changes with respect to the moving direction of the squeegeeing blade 111 during laminating and fabricating.

According to this embodiment, the scanning direction of the irradiator is changed with respect to the moving direction of the squeegeeing blade during laminating and fabricating, thereby suppressing, in advance, the squeegeeing blade from getting caught on a surface of a laminated and fabricated object.

[Second Embodiment]

Laminating and fabricating by a three-dimensional laminating and fabricating system according to the second embodiment of the present invention will be described next. In the three-dimensional laminating and fabricating system according to this embodiment, the scanning direction of a laminating material in a cell region by an irradiator is predicted based on three-dimensional fabricating data and changed for each cell region with resect to the moving direction of a squeegeeing blade configured to spread the laminating material on the upper layer of a laminated and fabricated object.

«Concept of Fabricating of Three-Dimensional Laminating and Fabricating System»

Figure 2:
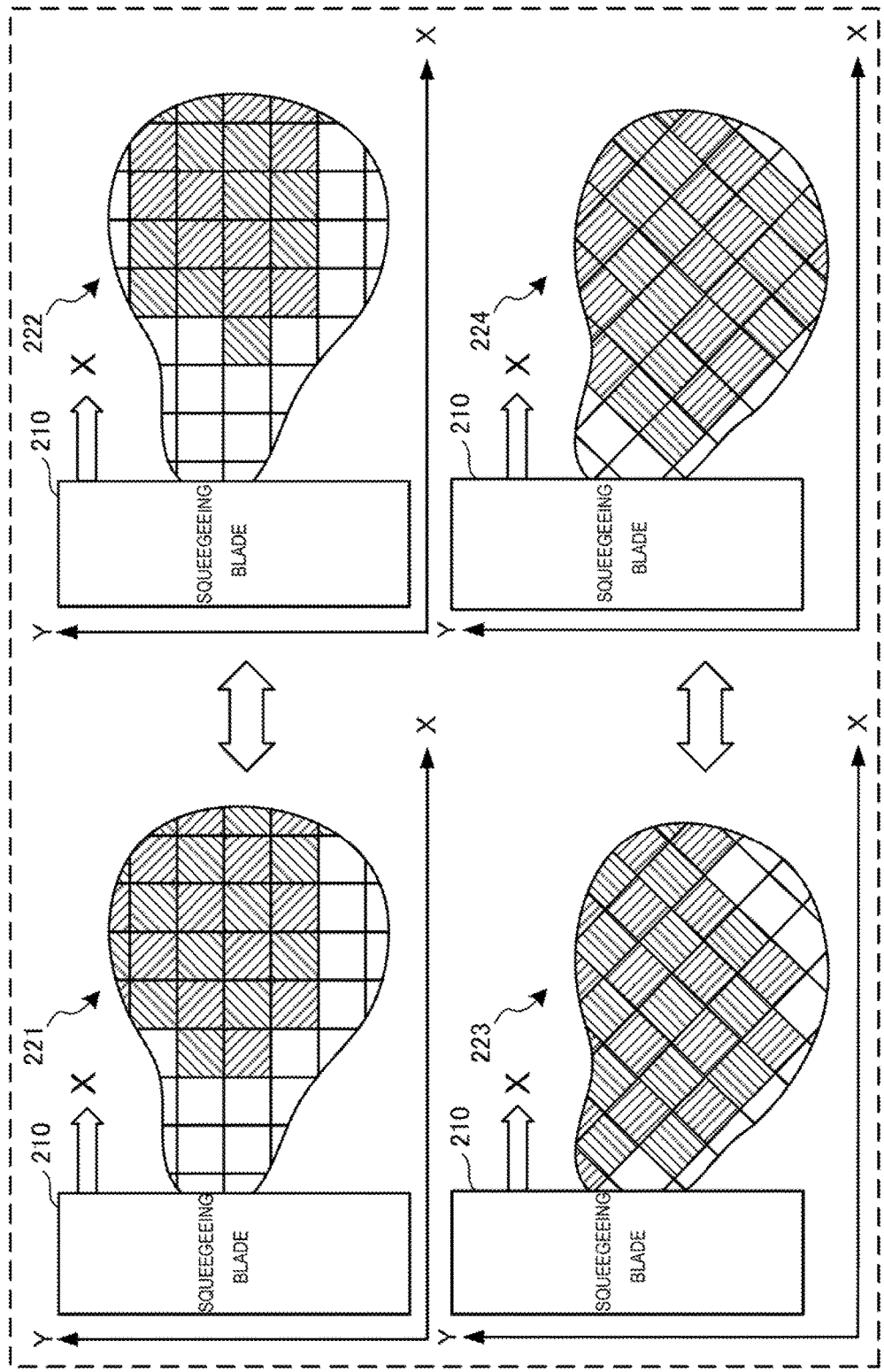
FIG. 2 is a conceptual view showing a fabricating state by a three-dimensional laminating and fabricating system according to the second embodiment of the present invention.

FIG. 2 is a conceptual view showing a fabricating state by the three-dimensional laminating and fabricating system according to this embodiment. For the sake of simplicity, FIG. 2 illustrates a moving direction X of a squeegeeing blade 210 configured to spread the laminating material on the upper layer of the laminated and fabricated object, and concerning the spread laminating material, the scanning directions of cell regions in two layers and scanning directions 221 to 224 of cell regions in one layer. However, the present invention is not limited to this.

The upper row of FIG. 2 shows a change in the scanning direction of rectangular cell regions that are arranged at a right angle with respect to (or in parallel to) the moving direction X of the squeegeeing blade 210. The scanning direction 221 of the cell regions is a scanning direction having an angle of 45° with respect to the moving direction X of the squeegeeing blade 210. This layer is one layer in which the scanning direction changes on a cell region basis. The scanning direction 222 of the cell regions is a scanning direction having an angle of 45° with respect to the moving direction X of the squeegeeing blade 210. This layer is another layer in which the scanning direction changes on a cell region basis. The scanning direction 221 of the cell regions and the scanning direction 222 of the cell regions are different from each other. This suppresses formation of a projecting portion on the upper layer of the fabricated object due to continuation of the same scanning direction.

The lower row of FIG. 2 shows a change in the scanning direction of rectangular cell regions that are arranged while tilting 45° with respect to the moving direction X of the squeegeeing blade 210. The scanning direction 223 of the cell regions is a scanning direction parallel to the sides of the rectangles of the cell regions but having an angle of 45° with respect to the moving direction X of the squeegeeing blade 210. This layer is one layer in which the scanning direction changes on a cell region basis. The scanning direction 224 of the cell regions is a scanning direction having an angle of 45° with respect to the moving direction X of the squeegeeing blade 210. This layer is another layer in which the scanning direction changes on a cell region basis. The scanning direction 223 of the cell regions and the scanning direction 224 of the cell regions are different from each other in the same cell region. This suppresses formation of a projecting portion on the upper layer of the fabricated object due to continuation of the same scanning direction.

Note that FIG. 2 shows an example of scanning directions having an angle of 45° with respect to the moving direction X of the squeegeeing blade 210. However, a scanning direction preferably makes an acute angle (<±90°) with the moving direction X of the squeegeeing blade 210. The difference between the scanning directions of the cell regions in two layers need not be 90°.

«Functional Arrangement of Laminating and Fabricating Unit»

Figure 3:
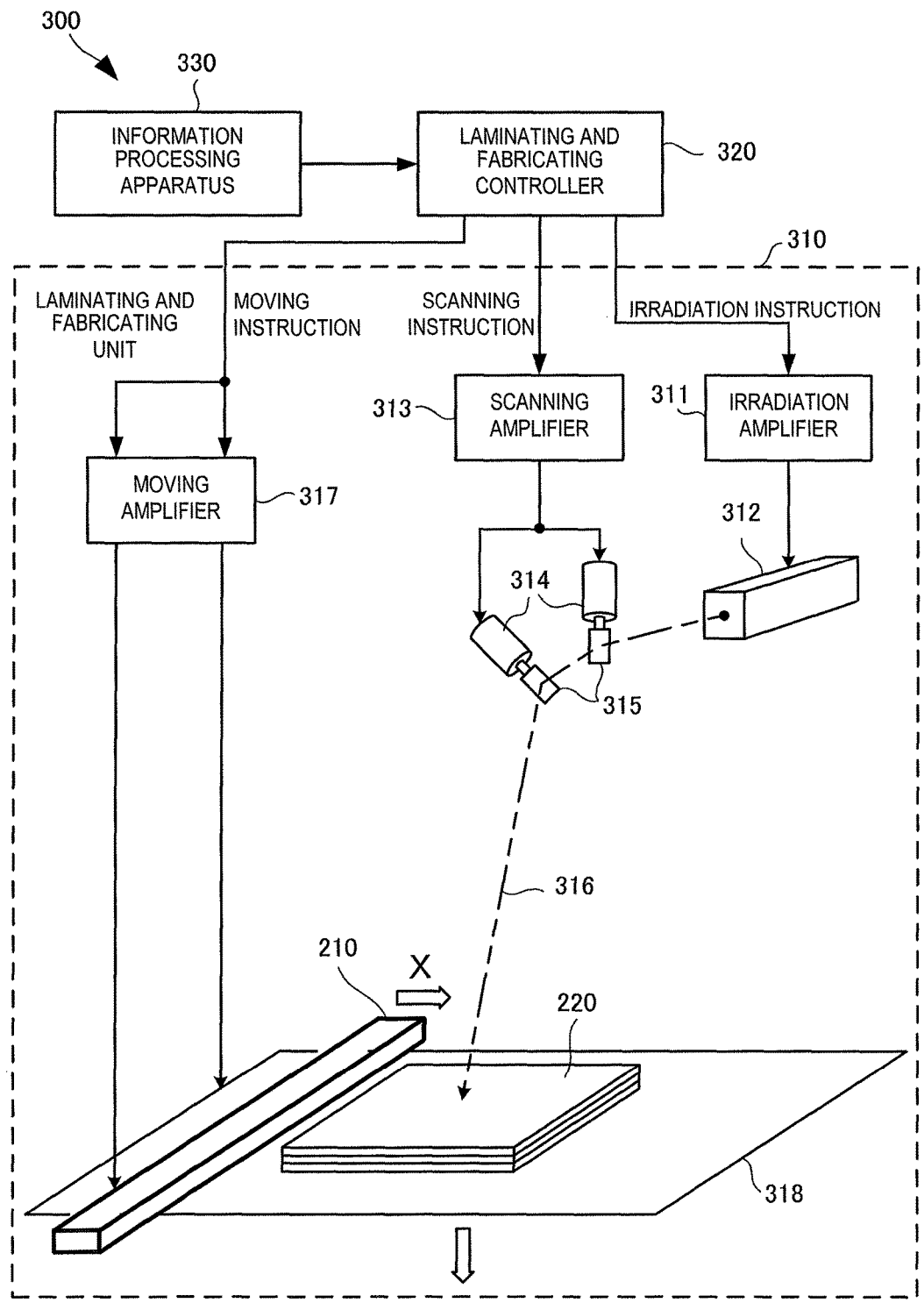
FIG. 3 is a block diagram showing the functional arrangement of a laminating and fabricating unit in the three-dimensional laminating and fabricating system according to the second embodiment of the present invention.

FIG. 3 is a block diagram showing the functional arrangement of a laminating and fabricating unit 310 in a three-dimensional laminating and fabricating system 3011 according to this embodiment.

The three-dimensional laminating and fabricating system 300 includes the laminating and fabricating unit 310, a laminating and fabricating controller 320, and an information processing apparatus 330. The laminating and fabricating unit 310 generates a three-dimensional laminated and fabricated object in accordance with various kinds of control instructions from the laminating and fabricating controller 320. The laminating and fabricating controller 320 generates various kinds of control instructions used to control the laminating and fabricating unit 310 in accordance with three-dimensional fabricating data generated by the information processing apparatus 330. The control instructions include an irradiation instruction used to control an irradiator 312 by an irradiation amplifier 311, a scanning instruction used to control an operation direction by a scanning amplifier 313 via a rotary step motor 314, and a moving instruction used to control the movement of the squeegeeing blade 210 or a fabricating table 318. The information processing apparatus 330 acquires the information of a laminated and fabricated object as a three-dimensional fabricating target and generates three-dimensional fabricating data. Note that the information processing apparatus 330 may be a general-purpose computer or a special computer corresponding to this embodiment.

The laminating and fabricating unit 310 includes the irradiation amplifier 311 and the irradiator 312. The laminating and fabricating unit 310 also includes the scanning amplifier 313, the rotary step motor 314, and a mirror unit 315. The laminating and fabricating unit 310 also includes a moving amplifier 317, the squeegeeing blade 210, and the fabricating table 318.

Considering the moving direction X of the squeegeeing blade 210, a laser beam 316 emitted by the irradiator 312 generates, via the mirror unit 315 rotated by the rotary step motor 314, a fabricated surface as an aggregate of cell regions irradiated in different scanning directions on the upper surface of a fabricated object 220 already laminated and fabricated on the fabricating table 318. After one layer is fabricated, the fabricating table 318 is moved down by a predetermined width (=layer thickness), and the laminating material of the next layer is spread by the squeegeeing blade 210 on the upper layer of the laminated and fabricated object. This operation is repeated in accordance with three-dimensional fabricating data, thereby generating a three-dimensional laminated and fabricated object.

«Functional Arrangement of Laminating and Fabricating Controller»

Figure 4:
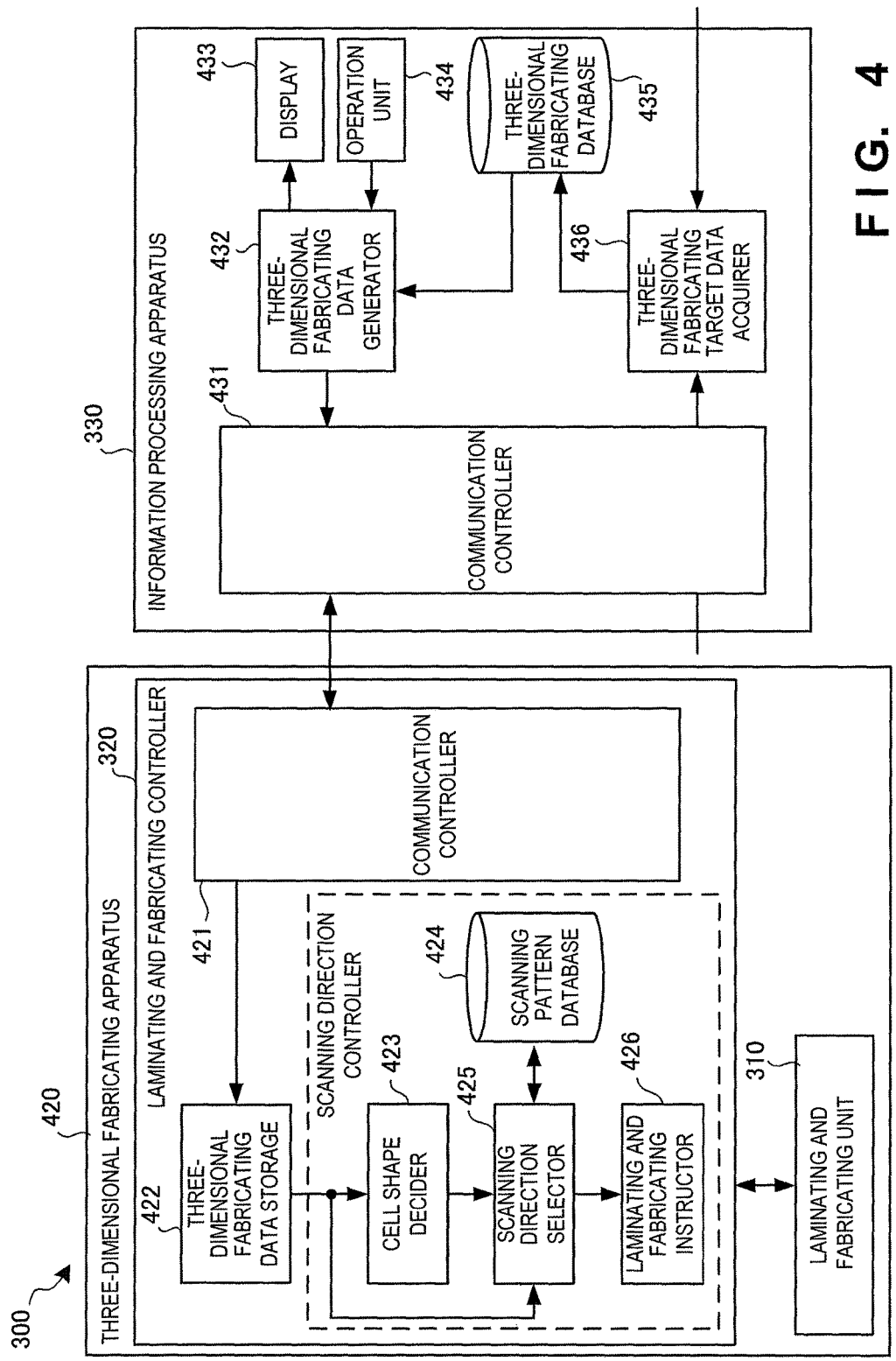
FIG. 4 is a block diagram showing the functional arrangement of a laminating and fabricating controller in the three-dimensional laminating and fabricating system according to the second embodiment of the present invention.

FIG. 4 is a block diagram showing the functional arrangement of the laminating and fabricating controller 320 in the three-dimensional laminating and fabricating system 300 according to this embodiment. FIG. 4 shows the functional arrangements of the laminating and fabricating controller 320 and the information processing apparatus 330 shown in FIG. 3. The laminating and fabricating unit 310 and the laminating and fabricating controller 320 may form a three-dimensional fabricating apparatus 420, that is, a so-called 3D printer. The arrangement of the laminating and fabricating unit 310 is the same as in FIG. 3, and a repetitive description will be omitted. Note that FIG. 4 illustrates the information processing apparatus 330 and the three-dimensional fabricating apparatus 420 including the laminating and fabricating controller 320 as separate apparatuses. However, they may be formed as one apparatus, or the laminating and fabricating controller 320 may be combined with the information processing apparatus 330.

The laminating and fabricating controller 320 includes a communication controller 421, a three-dimensional fabricating data storage 422, a cell shape decider 423, a scanning pattern database 424, a scanning direction selector 425, and a laminating and fabricating instructor 426.

The communication controller 421 controls communication between the laminating and fabricating controller 320 and the information processing apparatus 330 and receives three-dimensional fabricating data, an instruction command, or the like from the information processing apparatus 330, or transmits the status of the laminating and fabricating controller 320 or the laminating and fabricating unit 310 to the information processing apparatus 330. The three-dimensional fabricating data storage 422 stores three-dimensional fabricating data received from the information processing apparatus 330. Note that the three-dimensional fabricating data can be stored on the basis of a three-dimensional fabricated object or a layer to be laminated, and is appropriately decided based on the laminating and fabricating speed of the three-dimensional fabricating apparatus 420, the processing speed of the information processing apparatus 330, the communication capacity between the information processing apparatus 330 and the laminating and fabricating controller 320, and the like.

The cell shape decider 423 decides the shape of cell regions in a layer to be fabricated by the laminating and fabricating unit 310. In this embodiment, for example, square cell regions arranged at a right angle with respect to (or in parallel to) the moving direction X of the squeegeeing blade 210 or tilting 45° with respect to the moving direction X are used. However, the present invention is not limited to this. Cell regions having a circular shape, an elliptical shape, or a polygonal shape with at least five vertices may be used. In this embodiment, a case in which the cell shape does not change during laminating and fabricating will be described.

The scanning pattern database 424 accumulates the history of scanning patterns as combinations of scanning directions in cell regions, which are suitably used without making the squeegeeing blade 210 get caught on a surface of the fabricated object, based on three-dimensional fabricating data, the characteristics of the three-dimensional fabricating apparatus, and the laminating and fabricating conditions. The scanning direction selector 425 selects the scanning direction of each cell region by, in this embodiment, predicting scanning patterns for the entire three-dimensional laminated and fabricated object, which can suppress the squeegeeing blade 210 from getting caught on a surface of the fabricated object of the target, or predicting the scanning pattern of each layer based on three-dimensional fabricating data currently under laminating and fabricating. The laminating and fabricating instructor 426 outputs an instruction to each unit of the laminating and fabricating unit 310 in correspondence with the scanning direction of each cell region selected by the scanning direction selector 425. The cell shape decider 423, the scanning pattern database 424, the scanning direction selector 425, and the laminating and fabricating instructor 426 form an entire scanning direction controller or a part thereof.

The information processing apparatus 330 can be a general-purpose computer such as a PC (Personal Computer). The information processing apparatus 330 includes a communication controller 431, a three-dimensional fabricating data generator 432, a display 433, an operation unit 434, a three-dimensional fabricating database 435, and a three-dimensional fabricating target data acquirer 436. Note that if the information processing apparatus 330 includes a three-dimensional fabricating target data generation function, the three-dimensional fabricating target data acquirer 436 serves as a three-dimensional fabricating target data generator.

The communication controller 431 controls communication with the three-dimensional fabricating apparatus 420 or a three-dimensional fabricating target data generation apparatus that is an external apparatus. The three-dimensional fabricating data generator 432 generates three-dimensional fabricating data used by the three-dimensional fabricating apparatus 420 to laminate and fabricate a three-dimensional fabricated object using data stored in the three-dimensional fabricating database 435 in accordance with an input or operation of the operator from the operation unit 434 according to an operation instruction displayed on the display 433. The display 433 notifies the status of the three-dimensional fabricating, apparatus 420 or the information processing apparatus 330, and requests the operator to input a parameter necessary for laminating and fabricating of a three-dimensional fabricated object. The operation unit 434 includes a keyboard, a pointing device, a touch panel, and the like, and accepts an input or operation instruction from the operator in accordance with an instruction displayed on the display 433. The three-dimensional fabricating database 435 stores the data, generation algorithm, generation parameter, and the like of the three-dimensional fabricated object that are data used by the three-dimensional fabricating data generator 432 to generate three-dimensional fabricating data. The three-dimensional fabricating target data acquirer 436 acquires the three-dimensional fabricating data provided by the three-dimensional fabricating target data generation apparatus via the communication controller 431 or from a storage medium or the like via an I/O interface.

(Scanning Direction Selector)

Figure 5:
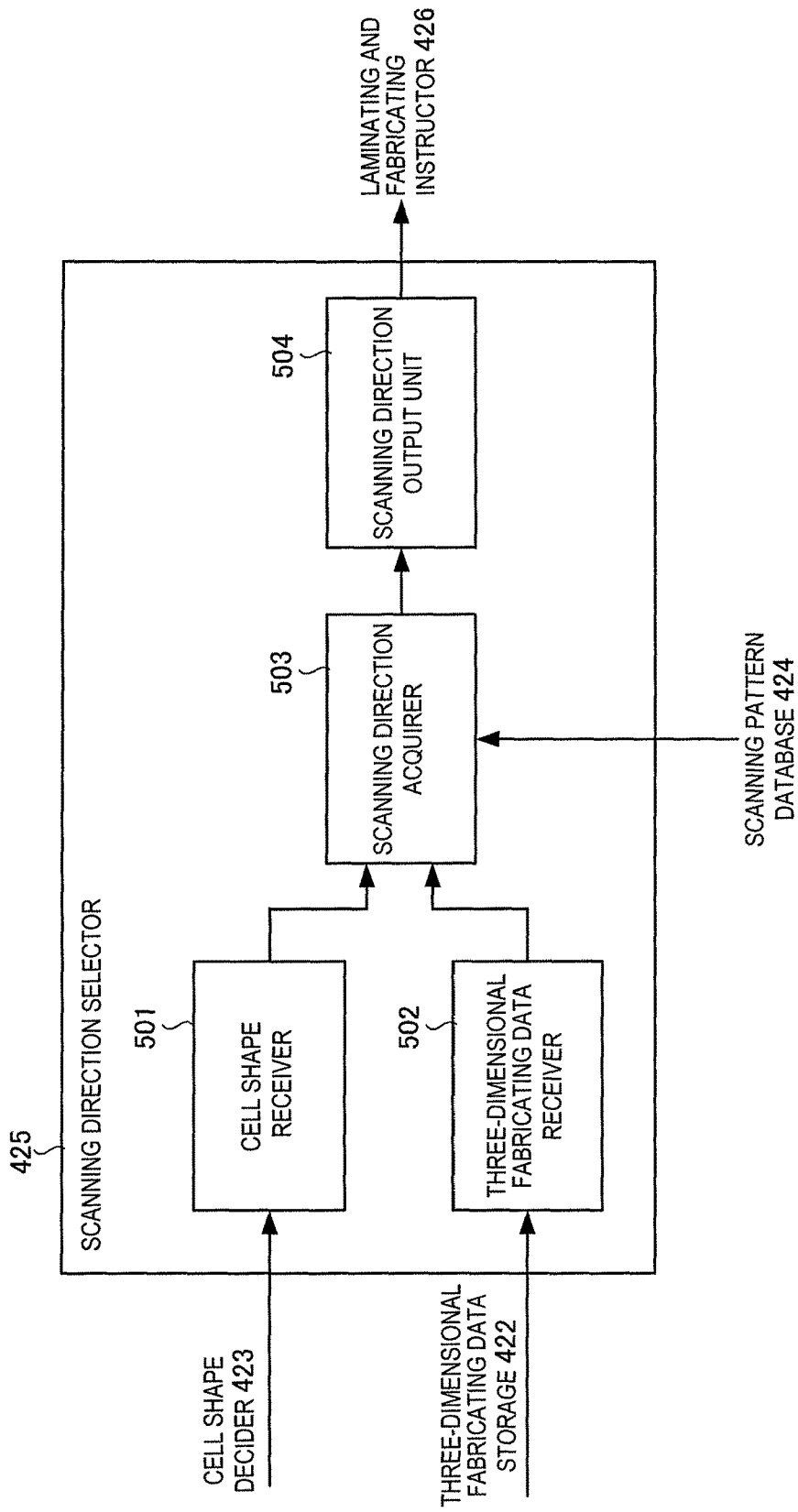
FIG. 5 is a block diagram showing the functional arrangement of a scanning direction selector according to the second embodiment of the present invention.

FIG. 5 is a block diagram showing the functional arrangement of the scanning direction selector 425 according to this embodiment.

The scanning direction selector 425 includes a cell shape receiver 501, a three-dimensional fabricating data receiver 502, a scanning direction acquirer 503, and a scanning direction output unit 504. The cell shape receiver 501 receives a decided cell shape from the cell shape decider 423. In this embodiment, square cell regions arranged at a right angle with respect to (or in parallel to) the moving direction X of the squeegeeing blade 210 or tilting 45° with respect to the moving direction X are used. The three-dimensional fabricating data receiver 502 receives three-dimensional fabricating data currently under laminating and fabricating from the three-dimensional fabricating data storage 422. The scanning direction acquirer 503 acquires, from the scanning pattern database 424, the scanning direction of each cell region capable of suppressing the squeegeeing blade 210 from getting caught on a surface of the fabricated object based on the three-dimensional fabricating data received by the three-dimensional fabricating data receiver 502 in consideration of the cell shape received by the cell shape receiver 501. The scanning direction output unit 504 outputs the scanning direction of each cell region to the laminating and fabricating instructor 426.

(Scanning Pattern Database)

Figure 6:
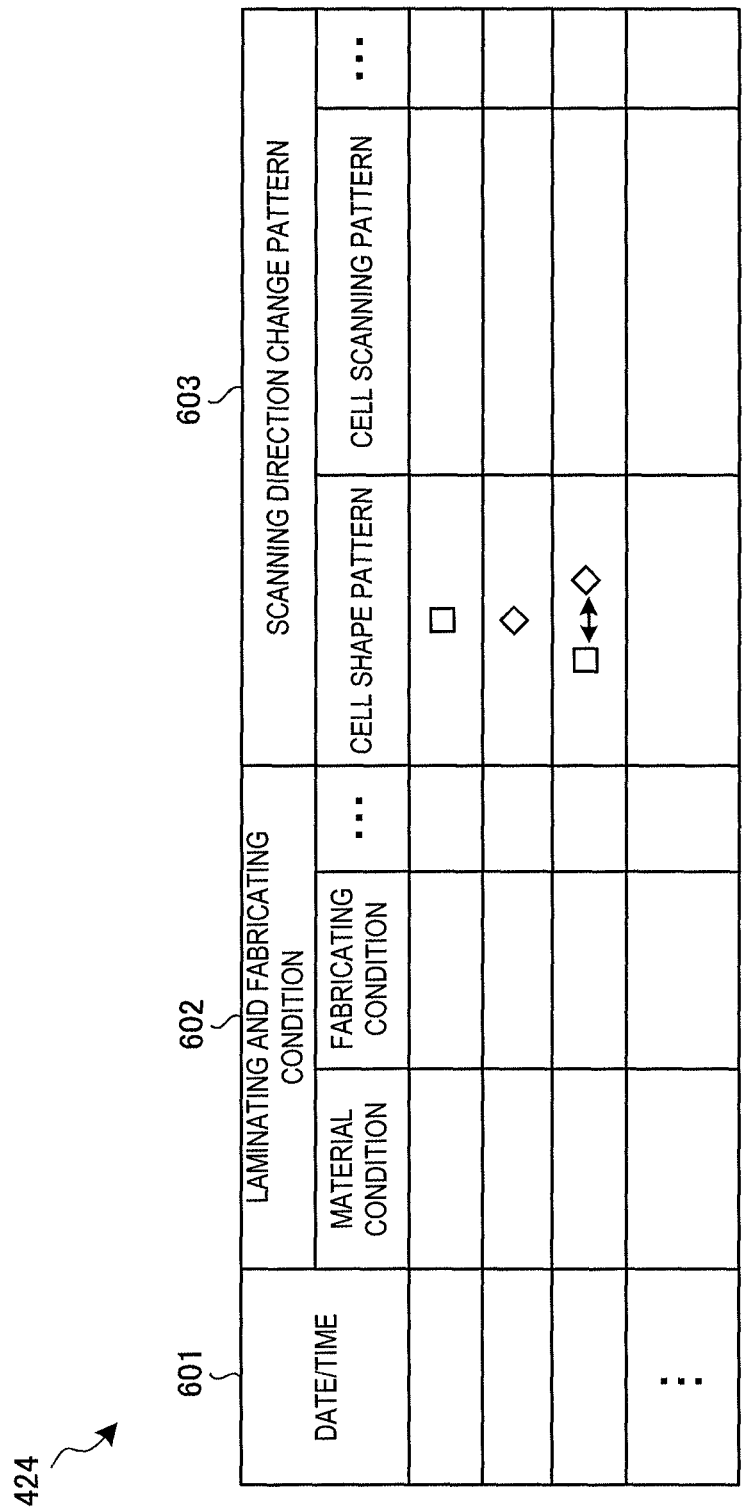
FIG. 6 is a view showing the arrangement of a scanning pattern database according to the second embodiment of the present invention.

FIG. 6 is a view showing the arrangement of the scanning pattern database 424 according to this embodiment. The scanning pattern database 424 accumulates the history of scanning patterns as combinations of scanning directions in cell regions, which are suitably used without making the squeegeeing blade 210 get caught on a surface of the fabricated object, based on three-dimensional fabricating data, the characteristics of the three-dimensional fabricating apparatus, and the laminating and fabricating conditions. The scanning pattern database 424 is referred to by the scanning direction selector 425 to select the scanning directions of the cell regions. Note that the scanning pattern database 424 is not limited to the arrangement shown in FIG. 6.

The scanning pattern database 424 accumulates the history of a laminating and fabricating condition 602 and a scanning direction change pattern 603 in association with a date/time 601 in which a scanning pattern of laminating and fabricating is acquired. As the laminating and fabricating condition 602, a laminating material, a fabricating condition, and the like are stored. The laminating and fabricating condition 602 also includes the characteristics of the three-dimensional fabricating apparatus 420, the features of three-dimensional fabricating data, and the like. The scanning direction change pattern 603 includes the change pattern of a cell shape used, a change pattern of scanning in a cell region, and the like. The change pattern of scanning in a cell region may include, for example, a repetitive change pattern such as a change pattern that repeats the change of the scanning direction at the same cell position on a layer basis or a change pattern that repeats the change of the scanning direction at the same cell position for every other layer or a random change pattern.

(Scanning Direction Selection Table)

FIG. 7 is a view showing the arrangement of a scanning direction selection table 700 according to this embodiment. The scanning direction selection table 700 is used by the scanning direction selector 425 to select the scanning direction of a cell region by referring to the scanning pattern database 424.

The scanning direction selection table 700 stores a laminating and fabricating condition 702 and a scanning direction 703 selected based on the laminating and fabricating condition 702 in association with an ID 701 of three-dimensional fabricating data stored in the three-dimensional fabricating data storage 422. As the laminating and fabricating condition 702, a laminating material, a fabricating condition, and the like are stored. The laminating and fabricating condition 702 also includes the characteristics of the three-dimensional fabricating apparatus 420, the features of three-dimensional fabricating data, and the like. The selected scanning direction 703 includes the change pattern of a cell shape or the change pattern of the scanning direction in a cell, which is acquired (predicted) from the scanning pattern database 424 based on the laminating and fabricating condition 702.

(Laminating and Fabricating Instruction Table)

Figure 8:
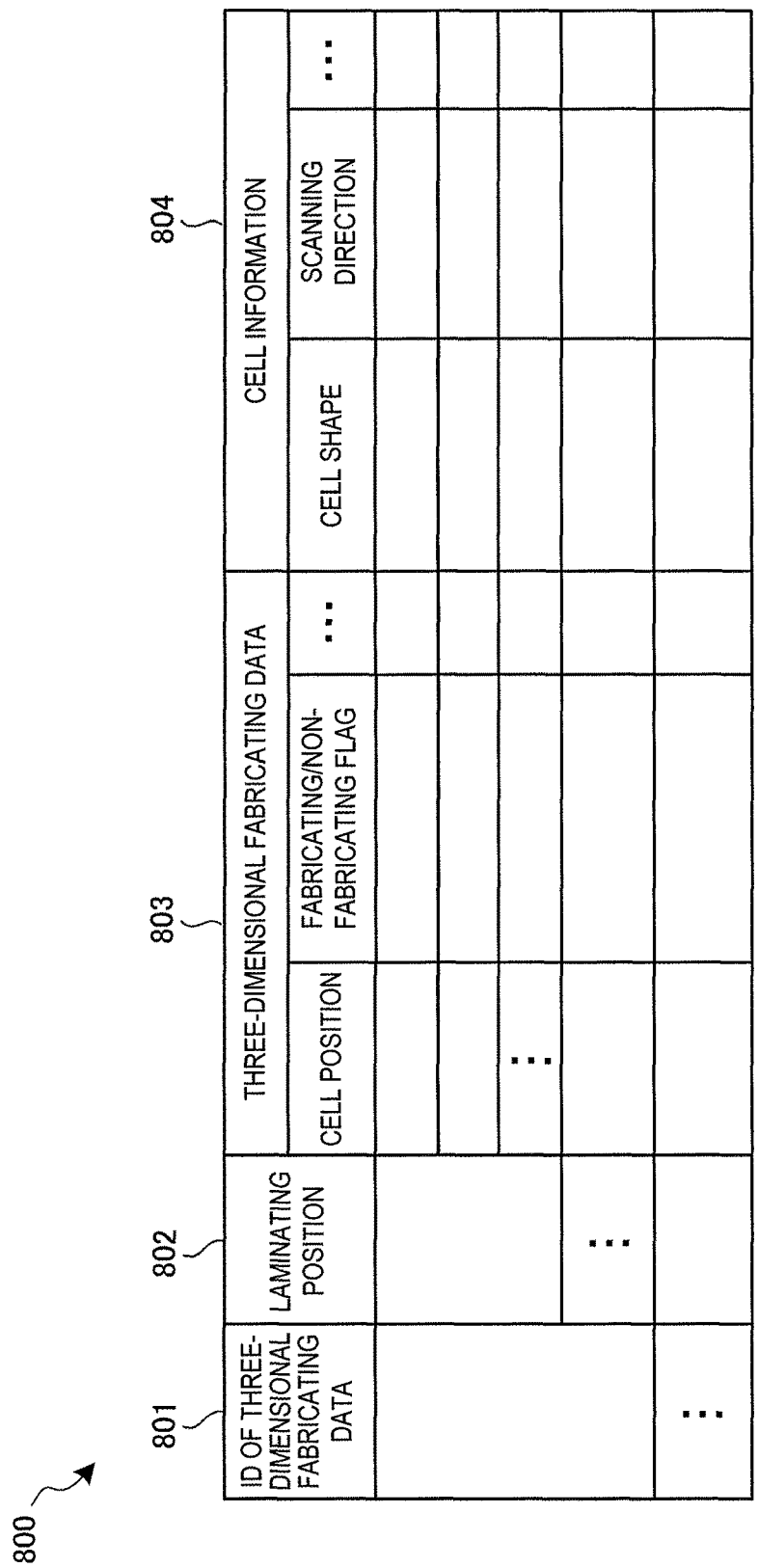
FIG. 8 is a view showing the arrangement of a laminating and fabricating instruction table according to the second embodiment of the present invention.

FIG. 8 is a view showing the arrangement of a laminating and fabricating instruction table 800 according to this embodiment. The laminating and fabricating instruction table 800 is used by the laminating and fabricating instructor 426 to generate a command to be transmitted to the laminating and fabricating unit 310 in correspondence with the scanning direction of each cell region selected by the scanning direction selector 425.

The laminating and fabricating instruction table 800 stores a laminating position 802 sequentially from a lower layer in association with an ID 801 of three-dimensional fabricating data stored in the three-dimensional fabricating data storage 422. The laminating and fabricating instruction table 800 stores three-dimensional fabricating data 803 and cell information 804 in each cell region in association with each laminating position 802. As the three-dimensional fabricating data 803, the cell position of each cell region, a flag representing whether to fabricate the cell position, and the like are stored. As the cell information 804, the cell shape of each cell region, the scanning direction of irradiation in the cell region, and the like are stored.

Note that when processing the three-dimensional fabricating data for each laminating position 802, the laminating position 802 need not be stored. If only a cell region to be fabricated is stored as the three-dimensional fabricating data 803, the flag representing whether to fabricate or not is unnecessary. In this embodiment, the cell shape in the cell information 804 is fixed, and the scanning direction is an angle (for example, 45°) with respect to the moving direction of the squeegeeing blade 210. However, a change in the cell shape or a scanning pattern different from a straight line may be used.

«Hardware Arrangement of Laminating and Fabricating Controller»

Figure 9:
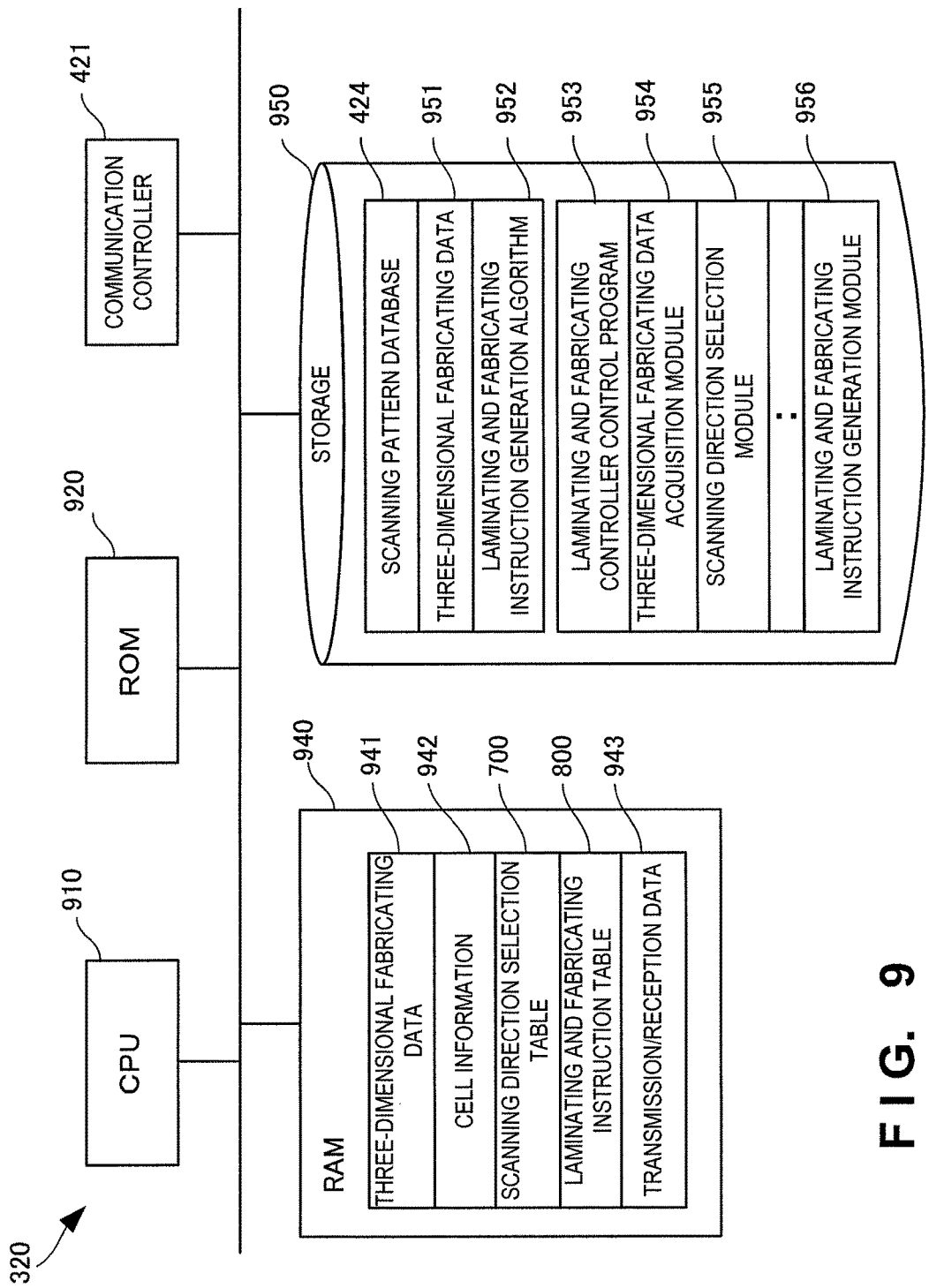
FIG. 9 is a block diagram showing the hardware arrangement of the laminating and fabricating controller according to the second embodiment of the present invention.

FIG. 9 is a block diagram showing the hardware arrangement of the laminating and fabricating controller 320 according to this embodiment.

In FIG. 9, a CPU (Central Processing Unit) 910 is a processor for arithmetic control and implements the functional components of the laminating and fabricating controller 320 shown in FIG. 4 by executing a program. A ROM (Read Only Memory) 921 stores initial data and permanent data such as a program. The communication controller 421 communicates with the information processing apparatus 330 via a network or the like. Note that the number of CPUs 910 is not limited to one, and the CPU 910 may include a plurality of CPUs or a GPU (Graphics Processing Unit) for image processing. In particular, a processor configured to decide the cell shape or select the scanning direction and a processor configured to generate various kinds of instructions to control scanning of irradiation in the cell region based on received three-dimensional fabricating data are preferably separate processors. The communication controller 421 also preferably includes a CPU independent of the CPU 910 and writes or reads transmission/reception data in or from an area of a RAM (Random Access Memory) 940. In addition, a DMAC (Direct Memory Access Control) (not shown) that transfers data between the RAM 940 and a storage 950 is preferably provided. In this case, the CPU 910 recognizes that data is received by or transferred to the RAM 940, and processes the data. The CPU 910 prepares a processing result in the RAM 940, and leaves the subsequent transmission or transfer to the communication controller 421 or the DMAC.

The RAM 940 is a random access memory used by the CPU 910 as a work area for temporary storage. An area to store data necessary for implementation of the embodiment is allocated to the RAM 940. Three-dimensional fabricating data 941 is the data of a three-dimensional fabricated object that is currently laminated and fabricated. The cell information 942 is information that defines a cell region used to laminate and fabricate the three-dimensional fabricating data 941. The scanning direction selection table 700 is a table described with reference to FIG. 7 which is used by the scanning direction selector 425 to select the scanning direction in a cell region. The laminating and fabricating instruction table 800 is a table described with reference to FIG. 8 which is used by the laminating and fabricating instructor 426 to generate a command that instructs the laminating and fabricating unit 310 to irradiate the cell region in the selected scanning direction. Transmission/reception data 943 is data transmitted/received via the communication controller 421.

The storage 950 stores databases, various kinds of parameters, and following data and programs necessary for implementation of the embodiment. The scanning pattern database 424 accumulates the history of scanning patterns as combinations of scanning directions in cell regions, which are suitably used without making the squeegeeing blade 210 get caught on a surface of the fabricated object, based on three-dimensional fabricating data, the characteristics of the three-dimensional fabricating apparatus, and the laminating and fabricating conditions described with reference to FIG. 6. The scanning pattern database 424 is referred to by the scanning direction selector 425 to select the scanning directions of the cell regions. Three-dimensional fabricating data 951 is data for laminating and fabricating of a three-dimensional fabricated object, which is received from the information processing apparatus 330 via the communication controller 421 and stored. A laminating and fabricating instruction generation algorithm 952 is an algorithm used to generate an instruction to control the laminating and fabricating unit 310 based on the three-dimensional fabricating data 941, the cell position, and the scanning direction of a cell region.

The storage 950 stores the following programs. A laminating and fabricating controller control program 953 is a control program that controls the entire laminating and fabricating controller 320. A three-dimensional fabricating data acquisition module 954 is a module that communicates with the information processing apparatus 330 and acquires three-dimensional fabricating data. A scanning direction selection module 955 is a module used by the scanning direction selector 425 to predict the scanning direction of a cell region by referring to the scanning pattern database 424 so the squeegeeing blade 210 does not get caught on a surface of a fabricated object. A laminating and fabricating instruction generation module 956 is a module that generates various kinds of instructions to control the laminating and fabricating unit 310 based on the scanning direction in each cell region selected by the scanning direction selection module 955.

Note that programs and data associated with general-purpose functions and other implementable functions of the laminating and fabricating controller 320 are not shown in the RAM 940 or the storage 950 of FIG. 9.

«Processing Procedure of Laminating and Fabricating Controller»

Figure 10A:
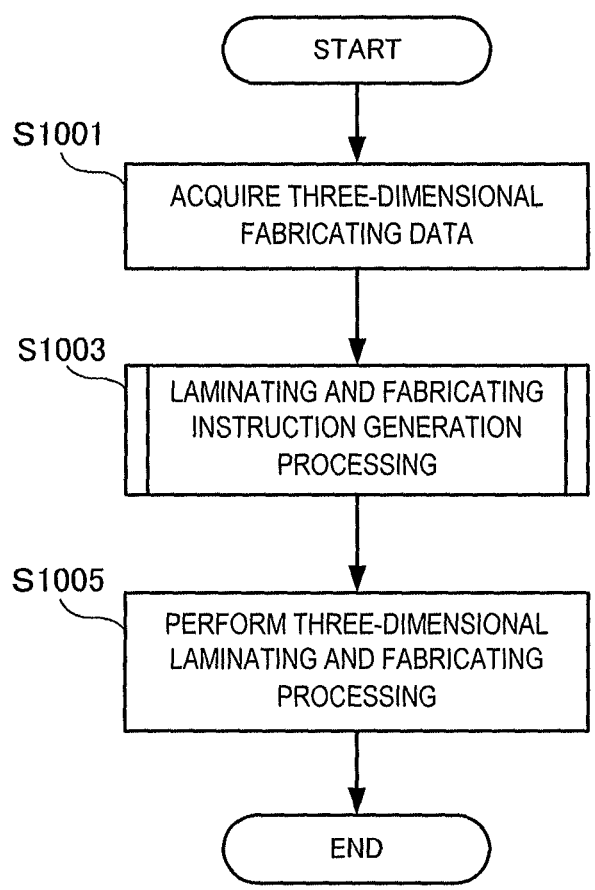
FIG. 10A is a flowchart showing the processing procedure of the laminating and fabricating controller according to the second embodiment of the present invention.

FIG. 10A is a flowchart showing the processing procedure of the laminating and fabricating controller 320 according to this embodiment. This flowchart is executed by the CPU 910 shown in FIG. 9 using the RAM 940 and implements the functional components of the laminating and fabricating controller 320 shown in FIG. 4.

In step S1001, the laminating and fabricating controller 320 receives three-dimensional fabricating data from the information processing apparatus 330 and stores it. In step S1003, the laminating and fabricating controller 320 executes generation processing of a laminating and fabricating instruction to the laminating and fabricating unit 310 for which the scanning direction of a cell region is predicted based on the acquired three-dimensional fabricating data so the squeegeeing blade 210 does not get caught on a surface of a fabricated object. In step S1005, the laminating and fabricating controller 320 transmits the generated laminating and fabricating instruction to the laminating and fabricating unit 310 and executes laminating and fabricating processing of a three-dimensional fabricated object.

(Laminating and Fabricating Instruction Generation Processing)

Figure 10B:
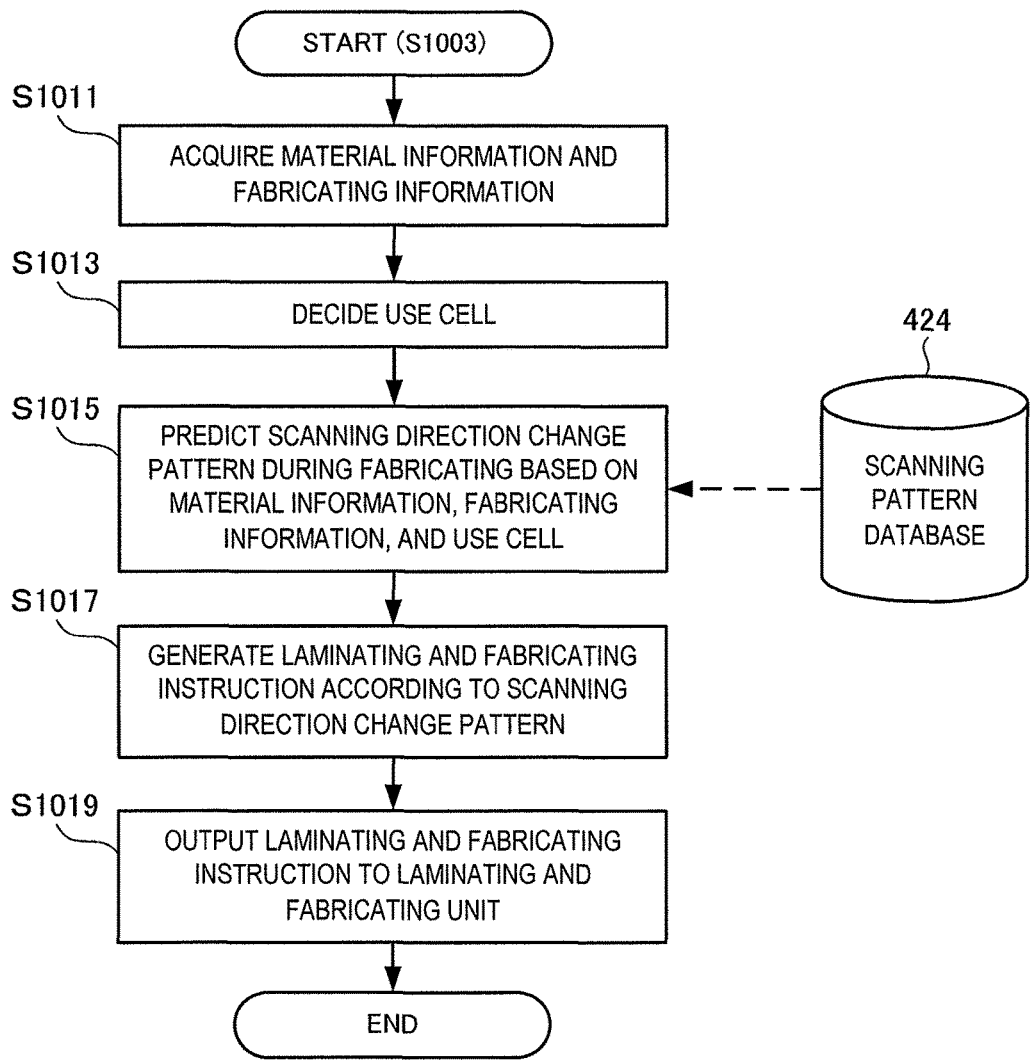
FIG. 10B is a flowchart showing the procedure of laminating and fabricating instruction generation processing according to the second embodiment of the present invention.

FIG. 10B is a flowchart showing the procedure of laminating and fabricating instruction generation processing (step S1003) according to this embodiment.

In step S1011, the laminating and fabricating controller 320 acquires information used to select the scanning direction, such as material information for laminating and fabricating and the information of the fabricated object. In step S1013, the laminating and fabricating controller 320 decides the shape, size, and the like of a cell region to be used. In this embodiment, the cell to be used is the same during one cycle of laminating and fabricating.

In step S1015, based on the information used to select the scanning direction, which is acquired in step S1011, and the use cell decided in step S1013, the laminating and fabricating controller 320 refers to the scanning pattern database 424 and predicts the change pattern of the scanning direction in the cell region during laminating and fabricating.

In step S1017, the laminating and fabricating controller 320 generates a laminating and fabricating instruction used to control the laminating and fabricating unit 310 in accordance with the change pattern of the scanning direction in the cell region selected in step S1015. In step S1019, the laminating and fabricating controller 320 outputs the generated laminating and fabricating instruction to the laminating and fabricating unit 310.

According to this embodiment, the scanning direction of the irradiator with respect to the moving direction of the squeegeeing blade is predicted based on three-dimensional fabricating data during fabricating of each layer or so as to change the scanning direction between layers, thereby suppressing, in advance, the squeegeeing blade from getting caught on a surface of the laminated and fabricated object.

[Third Embodiment]

Laminating and fabricating by a three-dimensional laminating and fabricating system according to the third embodiment of the present invention will be described next. The three-dimensional laminating and fabricating system according to this embodiment is different from the second embodiment in that the scanning direction of an irradiator is changed every time a predetermined number of layers are laminated. The rest of the components and operations is the same as in the second embodiment. Hence, the same reference numerals denote the same components and operations, and a detailed description thereof will be omitted. For example, the arrangement of the scanning pattern database and the arrangement of the laminating and fabricating instruction table are the same as in the second embodiment, and a detailed description thereof will be omitted.

«Concept of Fabricating of Three-Dimensional Laminating and Fabricating System»

Figure 11:
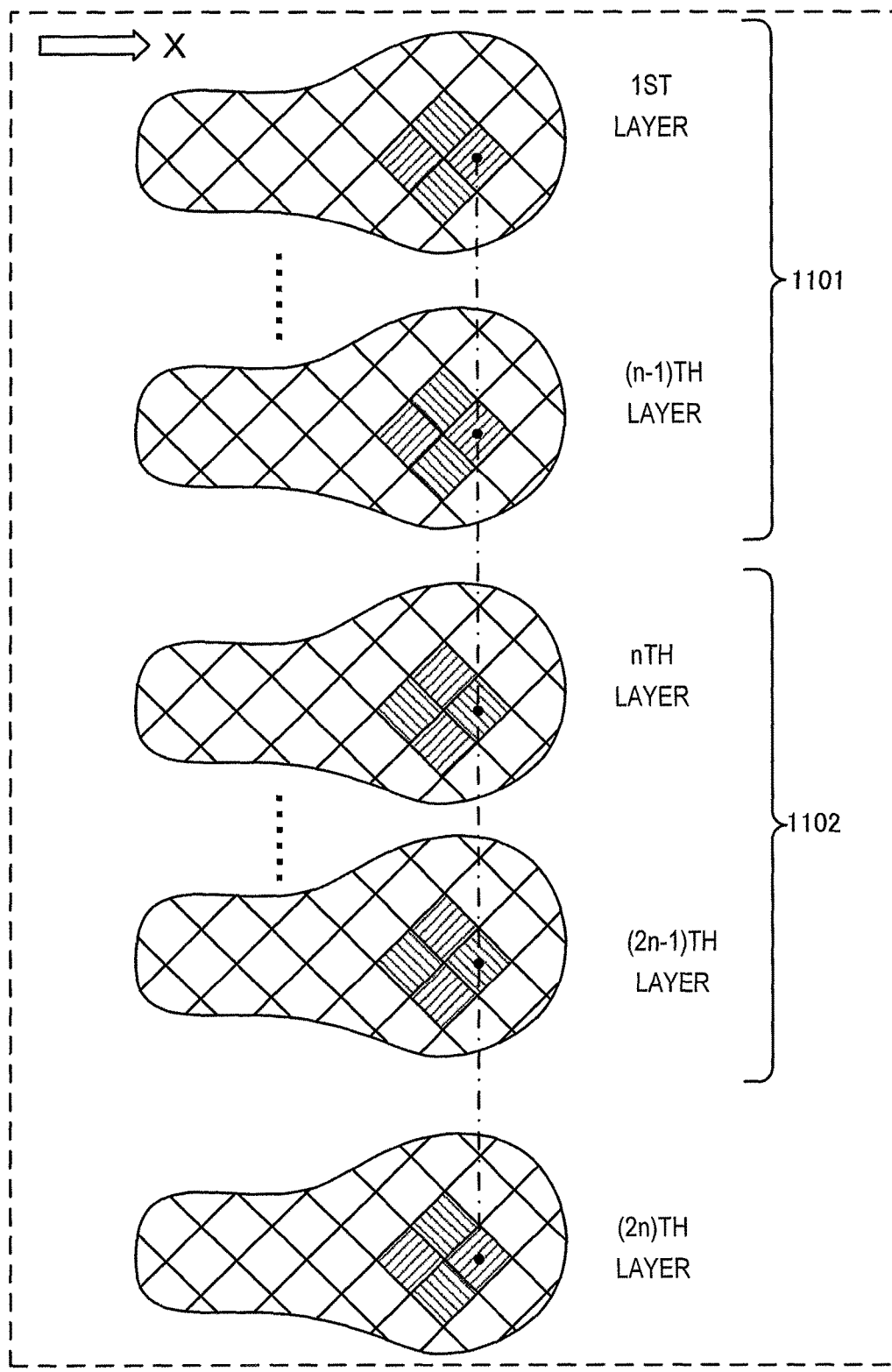
FIG. 11 is a conceptual view showing a fabricating state by a three-dimensional laminating and fabricating system according to the third embodiment of the present invention.

FIG. 11 is a conceptual view showing a fabricating state by the three-dimensional laminating and fabricating system according to this embodiment. For the sake of simplicity, FIG. 11 illustrates a moving direction X of a squeegeeing blade 210 configured to spread a laminating material on the upper layer of a laminated and fabricated object, and concerning the spread laminating material, the scanning directions of cell regions in n layers. However, the present invention is not limited to this. Note that FIG. 11 shows changes in the scanning directions of rectangular cell regions arranged while tilting 45° with respect to the moving direction X of the squeegeeing blade 210. However, the angle is not limited to this.

In an upper row 1101 of FIG. 11, n layers (the first layer to the (n−1)th layer) show changes in the scanning directions of rectangular cell regions arranged while tilting 45° with respect to the moving direction X of the squeegeeing blade 210. The scanning direction of each cell region is parallel to the sides of the rectangle of the cell region. Hence, n layers are shown in which the scanning direction has an angle of 45° with respect to the moving direction X of the squeegeeing blade 210, and the scanning direction changes on a cell region basis in each layer.

In a middle row 1102 of FIG. 11, n layers (the nth layer to the (2n−1)th layer) show that rectangular cell regions are arranged while tilting 45° with respect to the moving direction X of the squeegeeing blade 210, as in the upper row 1101, but the scanning direction of each cell region is different from that of the cell region at the same position in the upper row.

The (2n)th layer in the lower row of FIG. 11 shows that rectangular cell regions are arranged while tilting 45° with respect to the moving direction X of the squeegeeing blade 210, as in the upper row 1101, and the scanning direction of each cell region is the same as that of the cell region at the same position in the upper row 1101.

As described above, FIG. 11 shows an example in which the scanning direction of each cell region is changed for every n layers. However, the scanning direction need not be changed in all cell regions, as in FIG. 11. Cell regions to change the scanning directions may be selected by referring to cell positions or the like in the three-dimensional fabricated object. In FIG. 11, scanning directions tilting 45° with respect to the moving direction X of the squeegeeing blade 210 are alternately used. However, the present invention is not limited to this. Angles different from the moving direction X of the squeegeeing blade 210 are usable. In this case, the layers in the upper row 1101 and the (2n)th layer in the lower row do not have the same scanning directions.

(Scanning Direction Selector)

Figure 12:
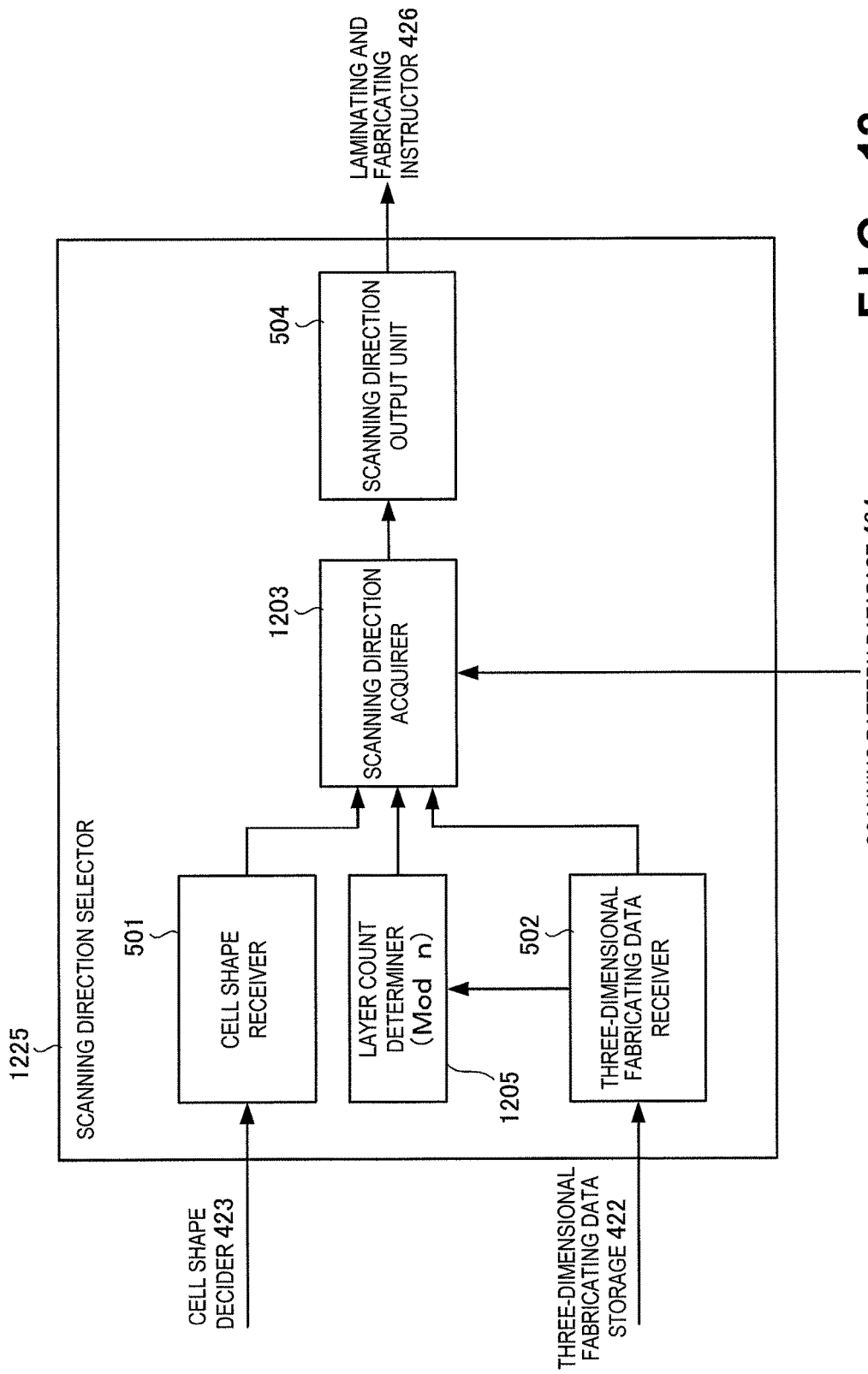
FIG. 12 is a block diagram showing the functional arrangement of a scanning direction selector according to the third embodiment of the present invention.

FIG. 12 is a block diagram showing the functional arrangement of a scanning direction selector 1225 according to this embodiment. Note that the same reference numerals as in FIG. 5 denote the same functional components in FIG. 12, and a repetitive description will be omitted.

A scanning direction acquirer 1203 acquires the scanning direction in a cell region in consideration of information representing n-layer fabricating from a layer count determiner 1205 as well as a cell shape from a cell shape receiver 501, three-dimensional fabricating data received by a three-dimensional fabricating data receiver 502, and the change pattern of the scanning direction from a scanning pattern database 424. The layer count determiner 1205 generates information representing n-layer fabricating from the three-dimensional fabricating data received by the three-dimensional fabricating data receiver 502 (that is, Mod n).

(Scanning Direction Selection Table)

FIG. 13 is a view showing the arrangement of a scanning direction selection table 1300 according to this embodiment. The scanning direction selection table 1300 is used by the scanning direction selector 1225 to select the scanning direction of a cell region for each layer count by referring to the scanning pattern database 424. Note that the same reference numerals as in FIG. 7 denote the same constituent components in FIG. 13, and a repetitive description will be omitted.

The scanning direction selection table 1300 stores a laminating and fabricating condition 702, a layer count 1304 to change the scanning direction, and a scanning direction 1303 selected for each layer count 1304 based on the laminating and fabricating condition 702 in association with an ID 701 of three-dimensional fabricating data stored in a three-dimensional fabricating data storage 422.

(Laminating and Fabricating Instruction Generation Processing)

Figure 14:
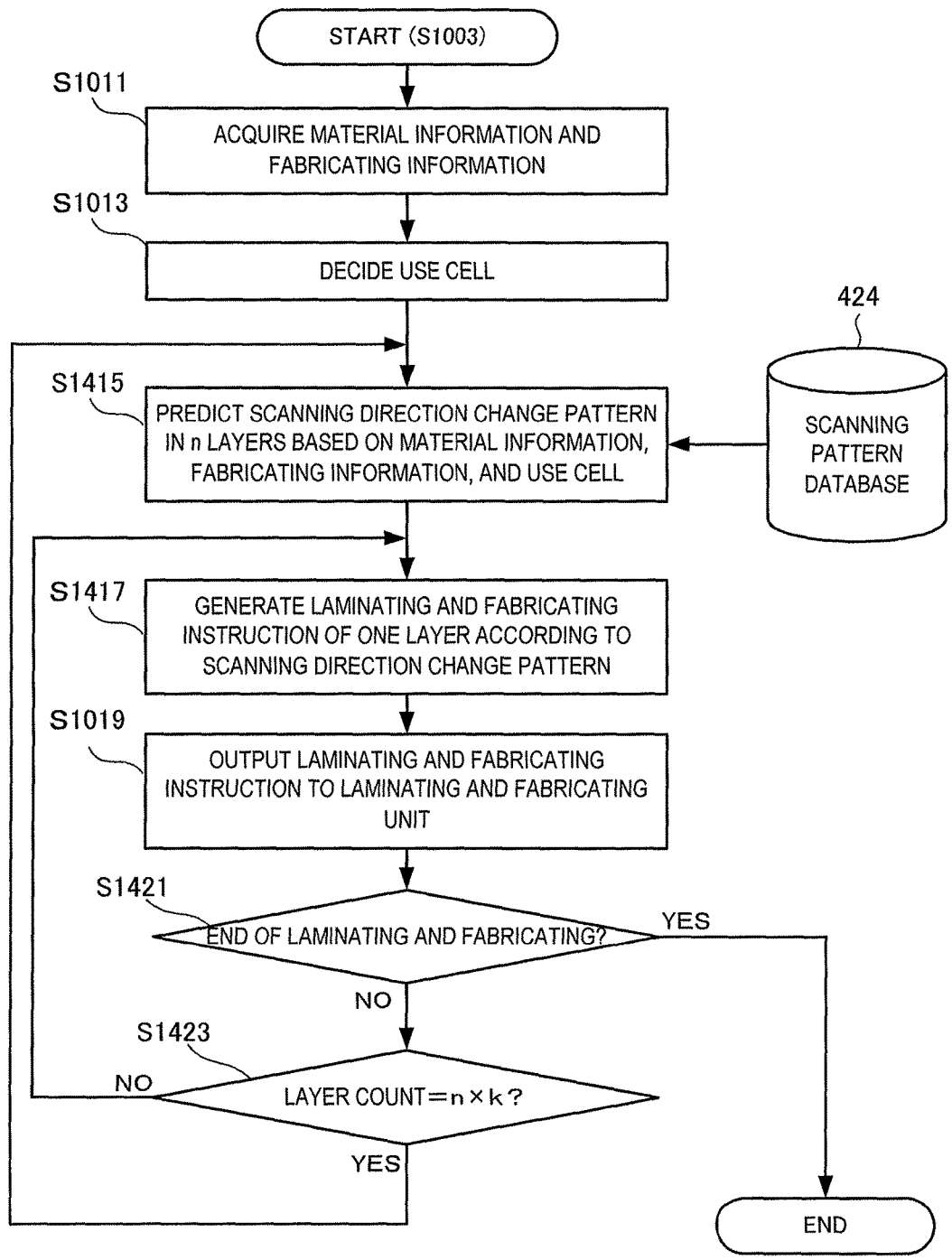
FIG. 14 is a flowchart showing the procedure of laminating and fabricating instruction generation processing according to the third embodiment of the present invention.

FIG. 14 is a flowchart showing the procedure of laminating and fabricating instruction generation processing (step S1003) according to this embodiment. Note that the same step numbers as in FIG. 10B denote the same steps in FIG. 14, and a repetitive description will be omitted.

In step S1415, based on the information used to select the scanning direction, which is acquired in step S1011, and the use cell decided in step S1013, a laminating and fabricating controller 320 refers to the scanning pattern database 424 and predicts the change pattern of the scanning direction in the cell region in the n layers. In step S1417, the laminating and fabricating controller 320 generates a laminating and fabricating instruction of one layer in accordance with the predicted scanning direction change pattern.

In step S1421, the laminating and fabricating controller 320 determines whether the laminating and fabricating of the three-dimensional fabricated object ends. If the laminating and fabricating of the three-dimensional fabricated object ends, the laminating and fabricating instruction generation processing ends. If the laminating and fabricating of the three-dimensional fabricated object does not end, in step S1423, the laminating and fabricating controller 320 determines whether the layer count is a multiple of n. If the layer count is not a multiple of n, the laminating and fabricating controller 320 returns to step S1417 to generate the laminating and fabricating instruction of the next layer.

If the layer count is a multiple of n, the laminating and fabricating controller 320 rooms to step S1415 to predict the scanning direction change pattern of the next n layers.

According to this embodiment, the scanning direction of the irradiator with respect to the moving direction of the squeegeeing blade is changed every time a predetermined number of layers are formed, thereby suppressing, in advance, the squeegeeing blade from getting caught on a surface of the laminated and fabricated object by simple control.

[Fourth Embodiment]

Laminating and fabricating by a three-dimensional laminating and fabricating system according to the fourth embodiment of the present invention will be described next.

The three-dimensional laminating and fabricating system according to this embodiment is different from the second or third embodiment in that the position of a cell region is changed every time a predetermined number of layers are laminated. The rest of the components and operations is the same as in the second and third embodiments. Hence, the same reference numerals denote the same components and operations, and a detailed description thereof will be omitted.

«Concept of Fabricating of Three-Dimensional Laminating and Fabricating System»

Figure 15A:
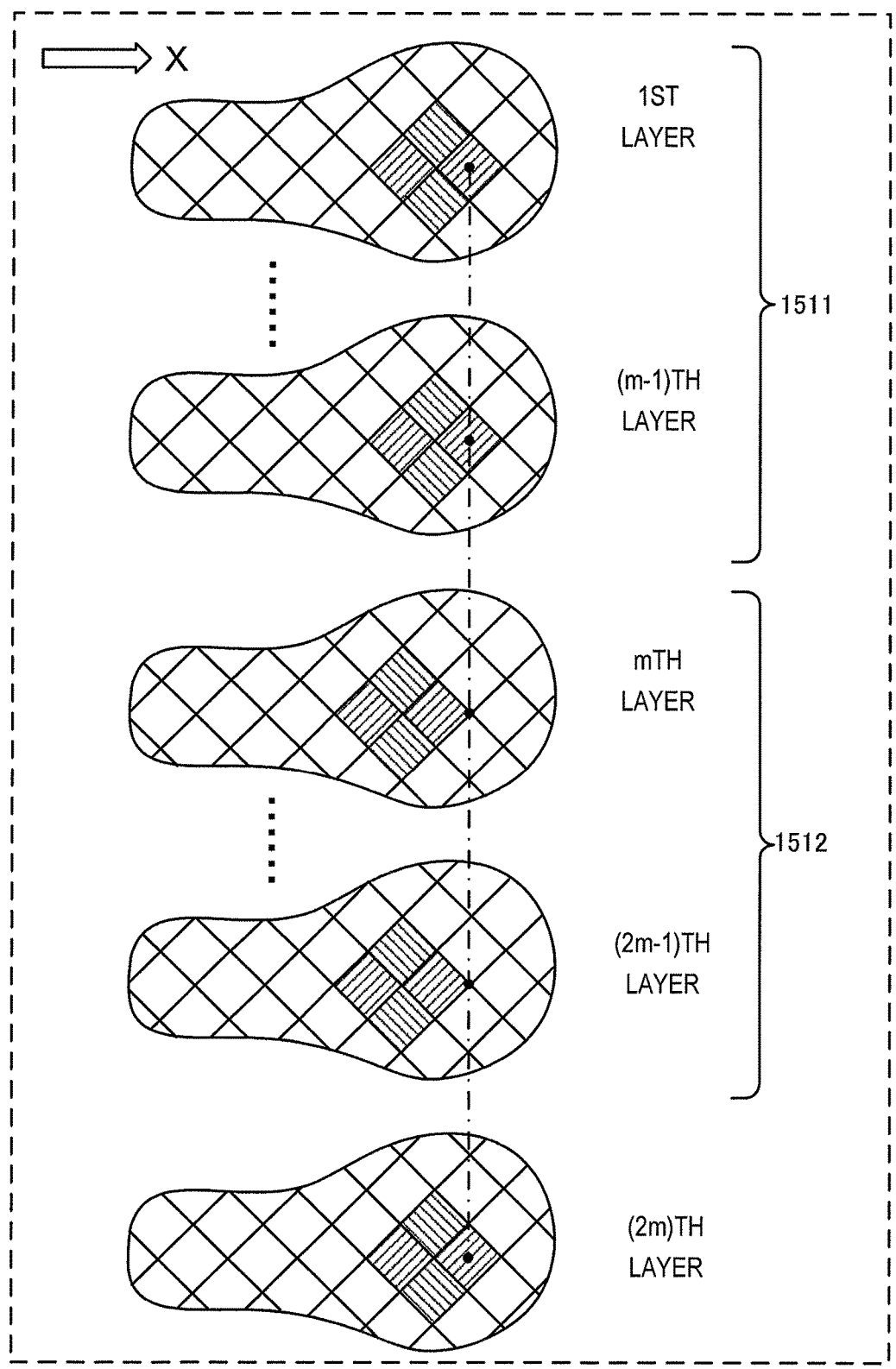
FIG. 15A is a conceptual view showing a fabricating state by a three-dimensional laminating and fabricating system according to the fourth embodiment of the present invention.

FIG. 15A is a conceptual view showing a fabricating state by the three-dimensional laminating and fabricating system according to this embodiment. For the sake of simplicity, FIG. 15A illustrates a moving direction X of a squeegeeing blade 210 configured to spread a laminating material on the upper layer of a laminated and fabricated object, and concerning the spread laminating material, the scanning directions of cell regions in in layers. However, the present invention is not limited to this. Note that FIG. 15A shows changes in the scanning directions of rectangular cell regions arranged while tilting 45° with respect to the moving direction X of the squeegeeing blade 210. However, the angle is not limited to this.

In an upper row 1511 of FIG. 15A, m layers (the first layer to the (m−1)th layer) show changes in the scanning directions of rectangular cell regions arranged while tilting 45° with respect to the moving direction X of the squeegeeing blade 210. The scanning direction of each cell region is parallel to the sides of the rectangle of the cell region. Hence, m layers are shown in which the scanning direction has an angle of 45° with respect to the moving direction X of the squeegeeing blade 210, and the scanning direction changes on a cell region basis in each layer.

In a middle row 1512 of FIG. 15A, as for the cell shape, m layers (the m-th layer to the (2m−1)th layer) show that rectangular cell regions are arranged while tilting 45° with respect to the moving direction X of the squeegeeing blade 210, as in the upper row 1511, but the positions of the cell regions are different. In FIG. 15A, the cell regions move by a half of a cell region in the moving direction X of the squeegeeing blade 210.

The (2m)th layer in the lower row of FIG. 15A shows that rectangular cell regions are arranged while tilting 45° with respect to the moving direction X of the squeegeeing blade 210, as in the upper row 1511, and the scanning direction of each cell region is the same as that of the cell region at the same position in the upper row 1511.

As described above, FIG. 15A shows an example in which the scanning directions are changed by changing the positions of the cell regions for every m layers. Note that FIG. 15A shows an example in which the movement of the cell regions is a movement by only a half of a cell region in the moving direction X of the squeegeeing blade 210. However, the moving amount is not limited to the half. In addition, the moving direction is not limited to the moving direction X of the squeegeeing blade 210, and the cell regions can be moved in any direction as long as the scanning direction changes at the same position (X- and Y-coordinates) of the laminating material. In FIG. 15A, scanning directions tilting 45° with respect to the moving direction X of the squeegeeing blade 210 are alternately used. However, the present invention is not limited to this. Angles different from the moving direction X of the squeegeeing blade 210 are usable. In this case, the layers in the upper row 1511 and the (2m)th layer in the lower row do not have the same scanning directions.

FIG. 15B is a conceptual view showing another fabricating state by the three-dimensional laminating and fabricating system according to this embodiment. For the sake of simplicity, FIG. 15B illustrates a moving direction X of the squeegeeing blade 210 configured to spread a laminating material on the upper layer of a laminated and fabricated object, and concerning the spread laminating material, the scanning directions of cell regions in m layers. However, the present invention is not limited to this. Note that FIG. 15B shows changes in rectangular cell regions arranged while tilting 45° with respect to the moving direction X of the squeegeeing blade 210 and cell regions arranged at 90° (in parallel). However, the angles are not limited to these.

In an upper row 1521 of FIG. 15B, m layers (the first layer to the (m−1)th layer) show changes in the scanning directions of rectangular cell regions arranged while tilting 45° with respect to the moving direction X of the squeegeeing blade 210. The scanning direction of each cell region is parallel to the sides of the rectangle of the cell region. Hence, m layers are shown in which the scanning direction has an angle of 45° with respect to the moving direction X of the squeegeeing blade 210, and the scanning direction changes on a cell region basis in each layer.

In a middle row 1522 of FIG. 15B, as for the cell shape, m layers (the m-th layer to the (2m−1)th layer) show that different rectangular cell regions are arranged at 90° (in parallel) with respect to the moving direction X of the squeegeeing blade 210, and the scanning directions are changed by changing the shapes of the cell regions.

The (2m)th layer in the lower row of FIG. 15B shows that rectangular cell regions are arranged while tilting 45° with respect to the moving direction X of the squeegeeing blade 210, as in the upper row 1521, and the scanning direction of each cell region is the same as that of the cell region at the same position in the upper row 1521.

As described above, FIG. 15B shows an example in which the scanning directions are changed by changing the shapes (orientations) of the cell regions for every m layers. Note that FIG. 15B shows an example in which the movement of the cell regions is a 45° rotation of the cell regions in the moving direction X of the squeegeeing blade 210. However, the rotation amount is not limited to 45°. In FIG. 15B, scanning directions tilting 45° with respect to the moving direction X of the squeegeeing blade 210 are alternately used. However, the present invention is not limited to this. Angles different from the moving direction X of the squeegeeing blade 210 are usable. In this case, the layers in the upper row 1521 and the (2m)th layer in the lower row do not have the same scanning directions.

Note that the scanning directions are changed by moving the cell regions in FIG. 15A and by changing the cell shapes (orientations) in FIG. 15B. However, the scanning directions may be changed by, for example, changing the cell size, or processing of changing the scanning direction at the same position (X- and Y-coordinates) of the laminating material may be included.

«Functional Arrangement of Laminating and Fabricating Controller»

Figure 16A:
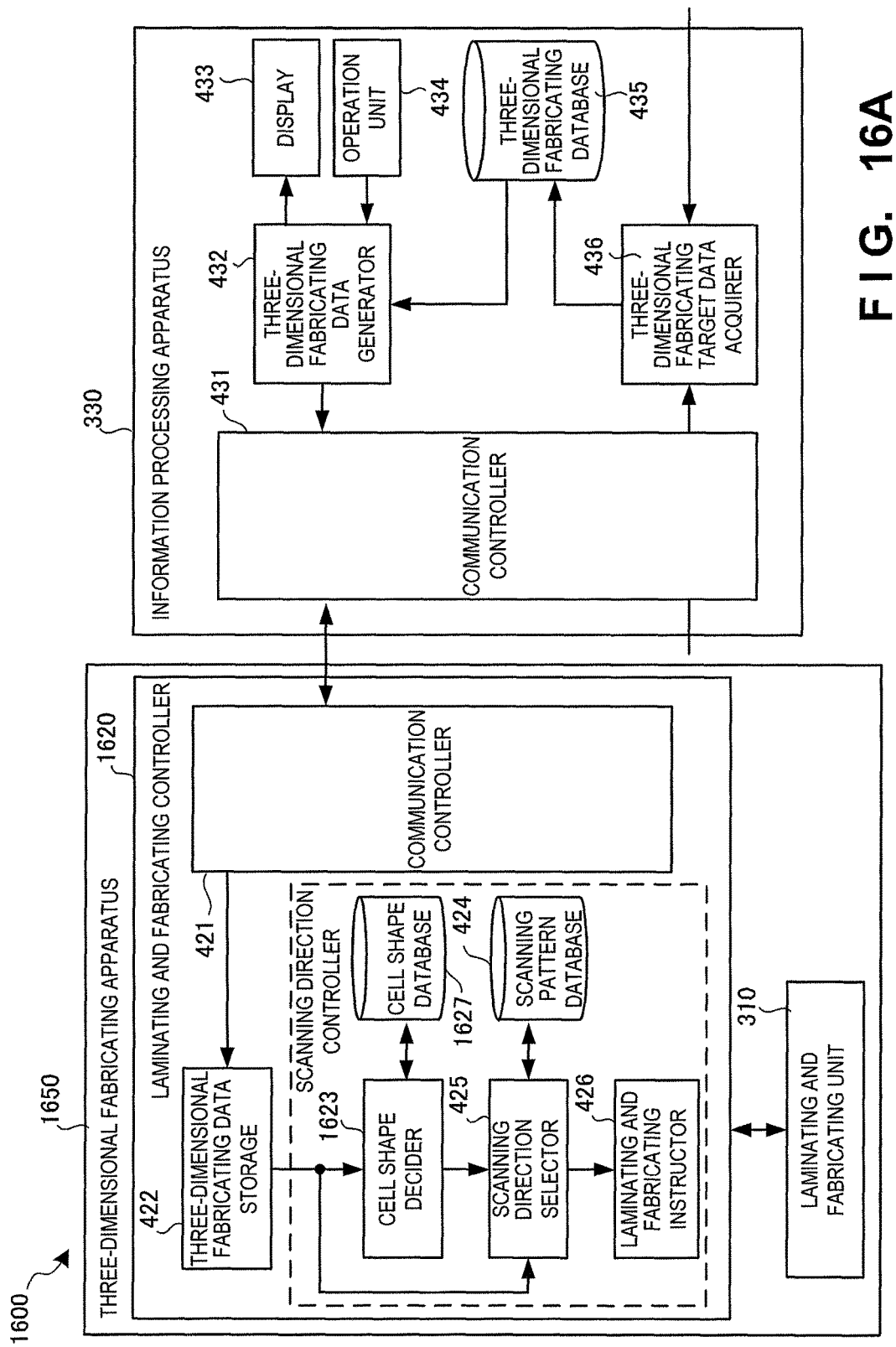
FIG. 16A is a block diagram showing the functional arrangement of a laminating and fabricating controller in the three-dimensional laminating and fabricating system according to the fourth embodiment of the present invention.

FIG. 16A is a block diagram showing the functional arrangement of a laminating and fabricating controller 1620 in a three-dimensional laminating and fabricating system 1600 according to this embodiment. Note that the same reference numerals as in FIG. 4 denote the same functional components in FIG. 16A, and a repetitive description will be omitted. FIG. 16A shows a three-dimensional fabricating apparatus 1650 including the laminating and fabricating controller 1620.

A cell shape decider 1623 changes a cell shape during laminating and fabricating by referring to the use history of cell shapes accumulated in a cell shape database 1627, unlike the cell shape decider 423 shown in FIG. 4. Note that the change of a cell shape includes a movement or rotation of a cell region or a change of a cell size. The cell shape database 1627 accumulates the history of cell shapes as combinations of cell shapes, which are suitably used without making the squeegeeing blade 210 get caught on a surface of the fabricated object, based on three-dimensional fabricating data, the characteristics of the three-dimensional fabricating apparatus, and the laminating and fabricating conditions. Note that the arrangement of the cell shape database 1627 is similar to that of a scanning pattern database 424 except the accumulation target, and a repetitive description will be omitted. The cell shape database 1627 may be a laminating and fabricating history database integrated with the scanning pattern database 424.

(Cell Shape Decider)

Figure 16B:
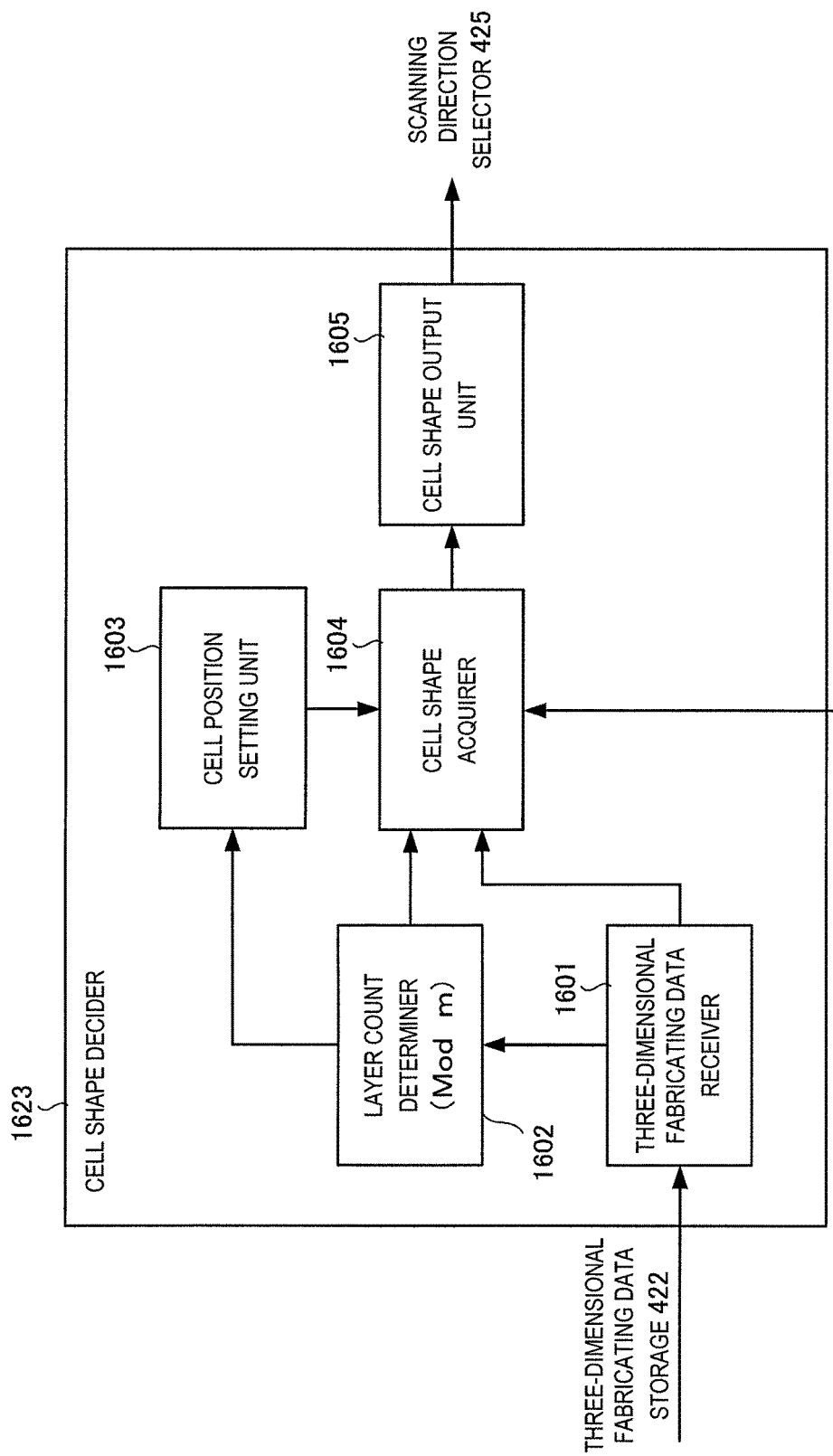
FIG. 16B is a block diagram showing the functional arrangement of a cell shape decider according to the fourth embodiment of the present invention.

FIG. 16B is a block diagram showing the functional arrangement of the cell shape decider 1623 according to this embodiment.

The cell shape decider 1623 includes a three-dimensional fabricating data receiver 1601, a layer count determiner 1602, a cell position setting unit 1603, a cell shape acquirer 1604, and a cell shape output unit 1605. The three-dimensional fabricating data receiver 1601 receives three-dimensional fabricating data from a three-dimensional fabricating data storage 422. The layer count determiner 1602 counts the number of layers from the three-dimensional fabricating data, and notifies that the layer count is a multiple of "m" (Mod m). Based on the notification from the layer count determiner 1602, which represents that the layer count is a multiple of m, the cell position setting unit 1603 makes a setting such that the positions of the cell regions change. The position change includes a movement in the horizontal direction (X, Y) and a rotation. The cell shape acquirer 1604 changes a cell shape acquired from the cell shape database 1627 in consideration of the three-dimensional fabricating data, the layer count, and a movement in the horizontal direction (X, Y), a rotation, and the like. The cell shape output unit 1605 outputs the cell shape set by the cell shape acquirer 1604 to a scanning direction selector 425 together with the position of the cell.

(Cell Shape Decision Table)

FIG. 17 is a view showing the arrangement of a cell shape decision table 1700 according to this embodiment. The cell shape decision table 1700 is used by the cell shape decider 1623 to decide a cell shape including a cell position for every m layers by referring to the cell shape database 1627.

The cell shape decision table 1700 stores a laminating and fabricating condition 1702, a layer count 1703 to change the cell shape, and a cell shape 1704 selected based on the laminating and fabricating condition 1702 in association with an ID 1701 of three-dimensional fabricating data stored in the three-dimensional fabricating data storage 422. As the laminating and fabricating condition 1702, a laminating material, a fabricating condition, and the like are stored. The laminating and fabricating condition 1702 also includes the characteristics of the three-dimensional fabricating apparatus 1650, the features of three-dimensional fabricating data, and the like. The selected cell shape 1704 includes the change pattern of a cell shape and the change pattern of a cell position (including a rotation) acquired (predicted) from the cell shape database 1627 based on the laminating and fabricating condition 1702.

(Laminating and Fabricating Instruction Generation Processing)

FIG. 18 is a flowchart showing the procedure of laminating and fabricating instruction generation processing (step S1003) according to this embodiment. Note that the same step numbers as in FIG. 10B or 14 denote the same steps in FIG. 18, and a repetitive description will be omitted.

In step S1813, the laminating and fabricating controller 1620 decides a cell shape or cell size to be used by referring to the cell shape database 1627. In step S1814, the laminating and fabricating controller 1620 decides the positions of cell regions by referring to the cell shape database 1627.

If the laminating and fabricating of the three-dimensional fabricated object does not end in step S1421, in step S1423, the laminating and fabricating controller 1620 determines whether the layer count is a multiple of n. If the layer count is not a multiple of n, the laminating and fabricating controller 1620 returns to step S1417 to generate the laminating and fabricating instruction of the next layer.

If the layer count is a multiple of n, the laminating and fabricating controller 1620 returns to step S1415 to predict the scanning direction change pattern of the next n layers.

According to this embodiment, the positions or shapes of cell regions are changed every time a predetermined number of layers are formed, and the scanning direction of the irradiator with respect to the moving direction of the squeegeeing blade is thus changed every time a predetermined number of layers are formed, thereby suppressing, in advance, the squeegeeing blade from getting caught on a surface of the laminated and fabricated object by simple control.

[Fifth Embodiment]

Laminating and fabricating by a three-dimensional laminating and fabricating system according to the fifth embodiment of the present invention will be described next. The three-dimensional laminating and fabricating system according to this embodiment is different from the second to fourth embodiments in that the scanning direction of a cell region by an irradiator is changed upon detecting an overload in the driver of a squeegeeing blade. The rest of the components and operations is the same as in the second to fourth embodiments. Hence, the same reference numerals denote the same components and operations, and a detailed description thereof will be omitted.

«Concept of Fabricating of Three-Dimensional Laminating and Fabricating System»

Figure 19:
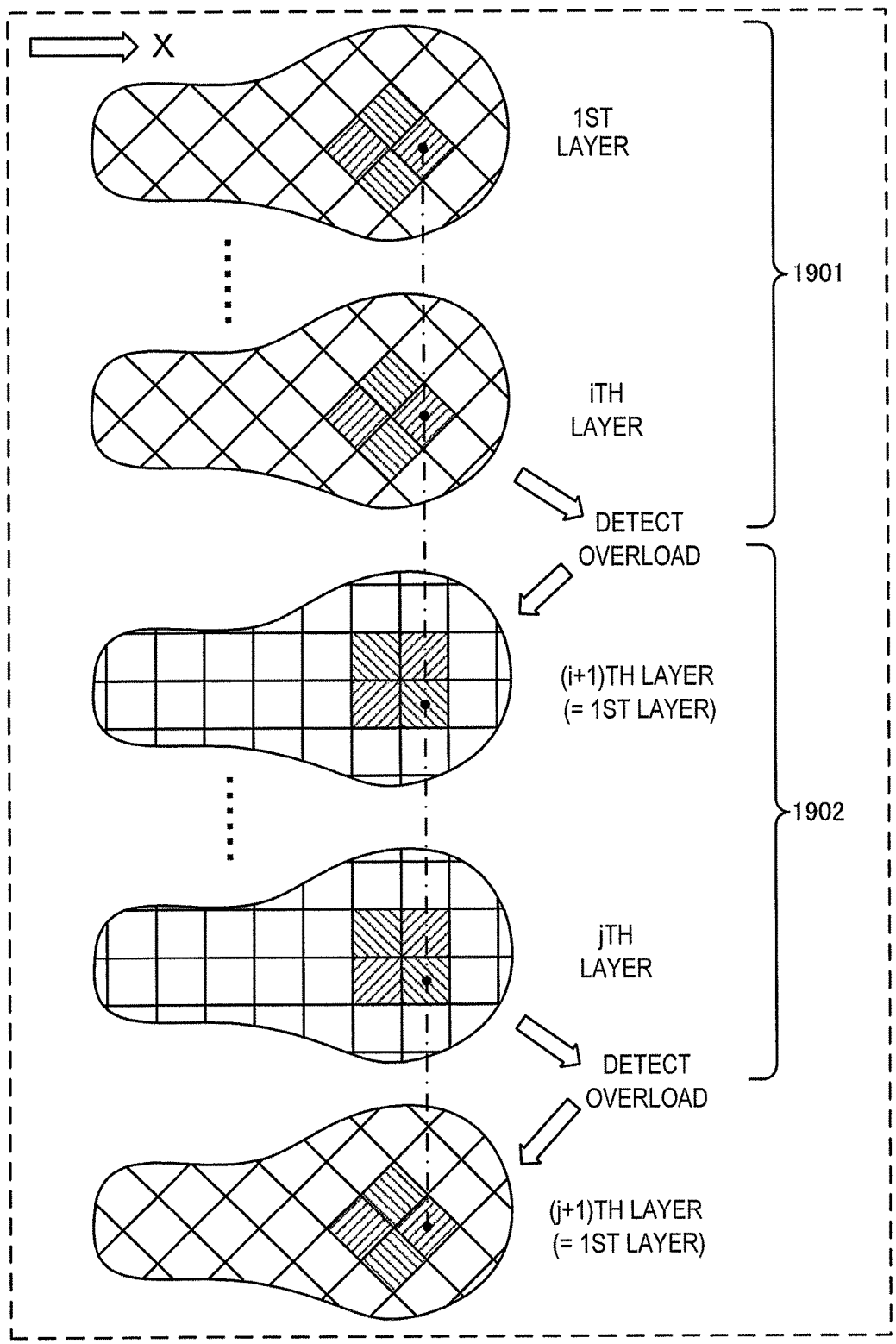
FIG. 19 is a conceptual view showing a fabricating state by a three-dimensional laminating and fabricating system according to the fifth embodiment of the present invention.

FIG. 19 is a conceptual view showing a fabricating state by the three-dimensional laminating and fabricating system according to this embodiment. For the sake of simplicity, FIG. 19 illustrates moving direction X of a squeegeeing blade 210 configured to spread a laminating material on the upper layer of a laminated and fabricated object, and concerning the spread laminating material, the scanning directions of regions in a case in which an overload is detected in the first i layers and next j layers. However, the present invention is not limited to this. Note that angles that are not limited to changes in the scanning directions of cell regions shown in FIG. 19 may be used.

In an upper row 1901 of FIG. 19, i layers (the first layer to the i-th layer) show changes in the scanning directions of rectangular cell regions arranged while tilting 45° with respect to the moving direction X of the squeegeeing blade 210. The scanning direction of each cell region is parallel to the sides of the rectangle of the cell region. Hence, i layers are shown in which the scanning direction has an angle of 45° with respect to the moving direction X of the squeegeeing blade 210, and the scanning direction changes on a cell region basis in each layer. Here, assume that an overload is detected when the squeegeeing blade 210 is moved after the laminating and fabricating of the i-th layer.

In a middle row 1902 of FIG. 19, as for the cell shape, j layers (the (i+1)th layer to the j-th layer) show that cell regions having a different rectangular shape are arranged at 90° (in parallel) with respect to the moving direction X of the squeegeeing blade 210, as shown in FIG. 15B, and the scanning directions are changed by changing the shapes of the cell regions. Here, assume that an overload is detected when the squeegeeing blade 210 is moved after the laminating and fabricating of the j-th layer.

The (j+1)th layer in the lower row of FIG. 19 shows that rectangular cell regions are arranged while tilting 45° with respect to the moving direction X of the squeegeeing blade 210, as in the upper row 1901, and the scanning direction of each cell region is the same as that of the cell region at the same position in the upper row 1901.

As described above, FIG. 19 shows an example in which the scanning directions in the cell regions are changed upon detecting an overload when moving the squeegeeing blade 210. Note that the method of changing the scanning directions in the cell regions is not limited to that shown in FIG. 19, and various methods described in the above embodiments are usable.

«Functional Arrangement of Laminating and Fabricating Controller»

Figure 20:
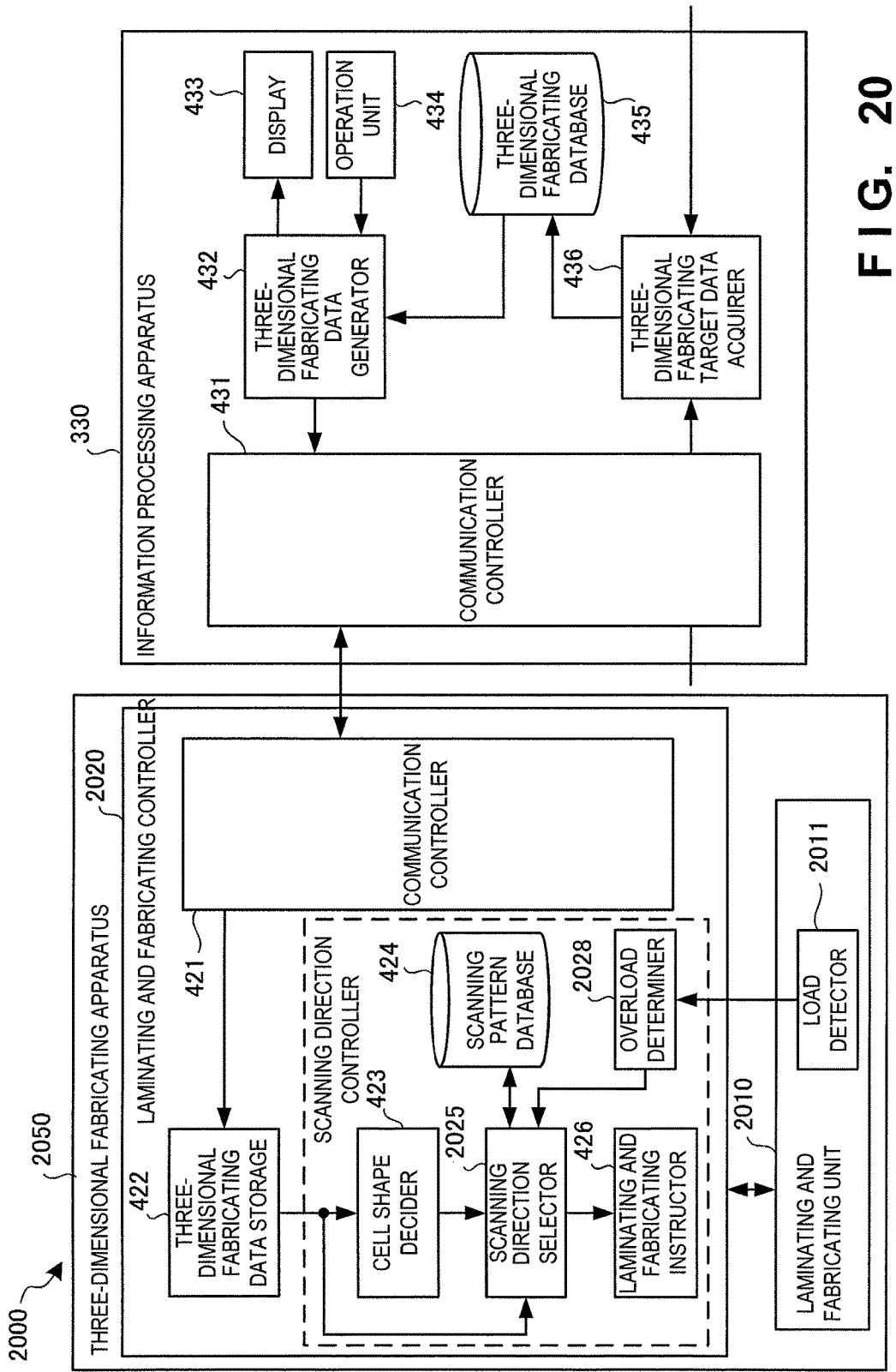
FIG. 20 is a block diagram showing the functional arrangement of a laminating and fabricating controller in the three-dimensional laminating and fabricating system according to the fifth embodiment of the present invention.

FIG. 20 is a block diagram showing the functional arrangement of a laminating and fabricating controller 2020 in a three-dimensional laminating and fabricating system 2000 according to this embodiment. Note that the same reference numerals as in FIG. 4 denote the same functional components in FIG. 20, and a repetitive description will be omitted. FIG. 20 shows a three-dimensional fabricating apparatus 2050 including the laminating and fabricating controller 2020.

A laminating and fabricating unit 2010 includes a load detector 2011 that detects a moving load of the squeegeeing blade 210. For example, the load detector 2011 may be implemented by detection of a torque in a mechanism configured to move the squeegeeing blade 210 or detection of a current to drive a motor, and the method is not particularly limited.

An overload determiner 2028 in the laminating and fabricating controller 2020 compares the load value detected by the load detector 2011 with a threshold, and if the load value exceeds the threshold, determines that an overload is generated. Note that as the threshold, a value detected before the squeegeeing blade 210 gets caught on a surface of the laminated and fabricated object to stop laminating and fabricating or a value that can be recovered from a change in the detected value or the like by changing the scanning directions in the cell regions is selected. A scanning direction selector 2025 changes the scanning directions in the cell regions using, as a trigger, the overload notification output from the overload determiner 202 in addition to three-dimensional fabricating data, a cell shape, and a scanning pattern from a scanning pattern database 424.

(Scanning Direction Selector)

Figure 21:
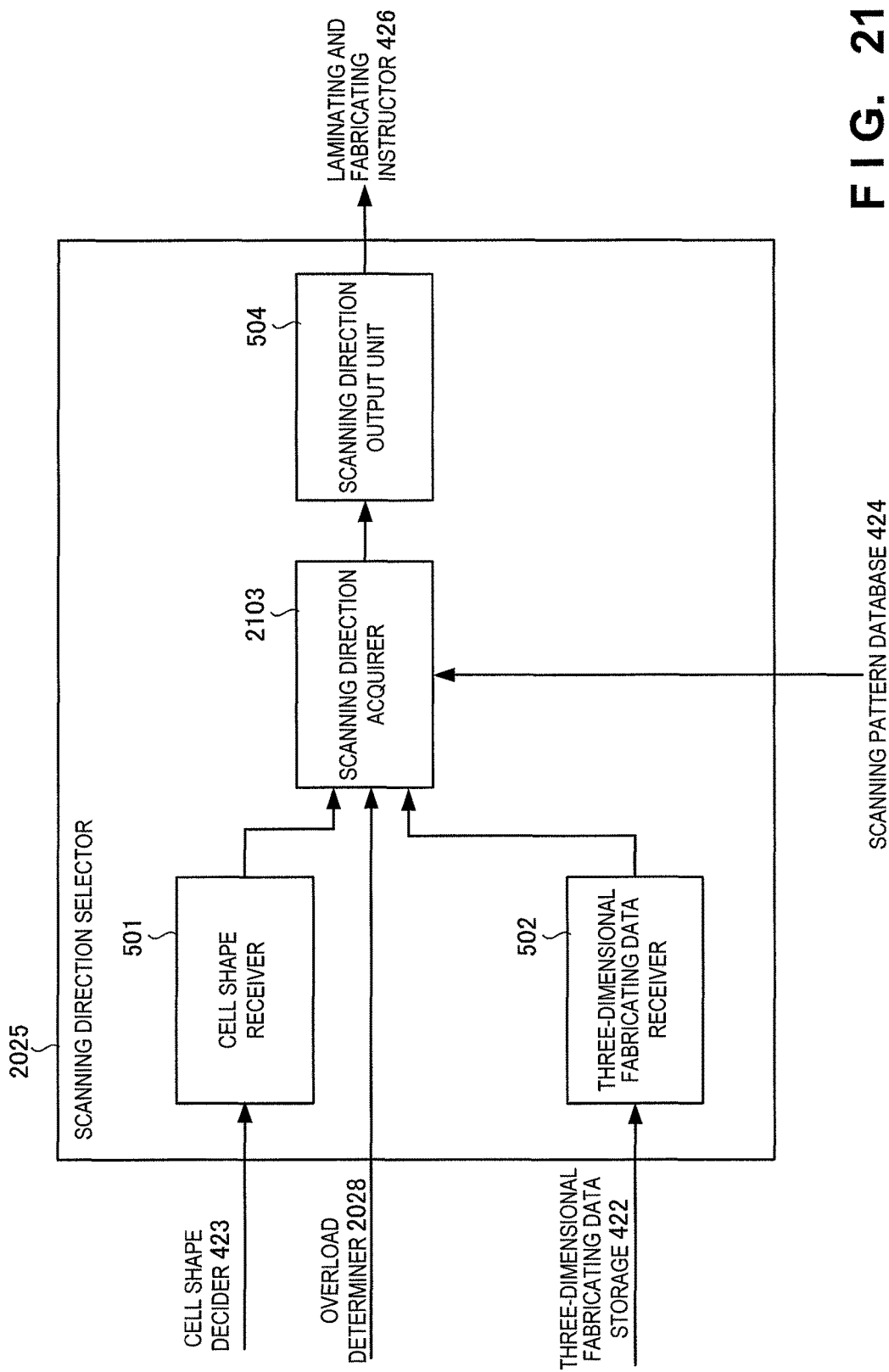
FIG. 21 is a block diagram showing the functional arrangement of a scanning direction selector according to the fifth embodiment of the present invention.

FIG. 21 is a block diagram showing the functional arrangement of the scanning direction selector 2025 according to this embodiment. Note that the same reference numerals as in FIG. 5 denote the same functional components in FIG. 21, and a repetitive description will be omitted.

A scanning direction acquirer 2103 acquires the scanning direction in a cell region using, as a trigger, the overload notification output from the overload determiner 2028 in addition to three-dimensional fabricating data from a three-dimensional fabricating data receiver 502, a cell shape from a cell shape receiver 501, and a scanning pattern from the scanning pattern database 424.

(Scanning Direction Selection Table)

FIG. 22 is a view showing the arrangement of a scanning direction selection table 2200 according to this embodiment. The scanning direction selection table 2200 is used by the scanning direction acquirer 2103 to acquire the scanning direction in a cell region using, as a trigger, the overload notification in addition to the three-dimensional fabricating data, the cell shape, and the scanning pattern. Note that the same reference numerals as in FIG. 7 denote the same constituent elements in FIG. 22, and a repetitive description will be omitted.

The scanning direction selection table 2200 stores a laminating and fabricating condition 702, whether an overload is detected 2204, and a scanning direction 2203 selected using overload detection as a trigger based on the laminating and fabricating condition 702 in association with an ID 701 of three-dimensional fabricating data stored in a three-dimensional fabricating data storage 422.

(Laminating and Fabricating Instruction Generation Processing)

Figure 23:
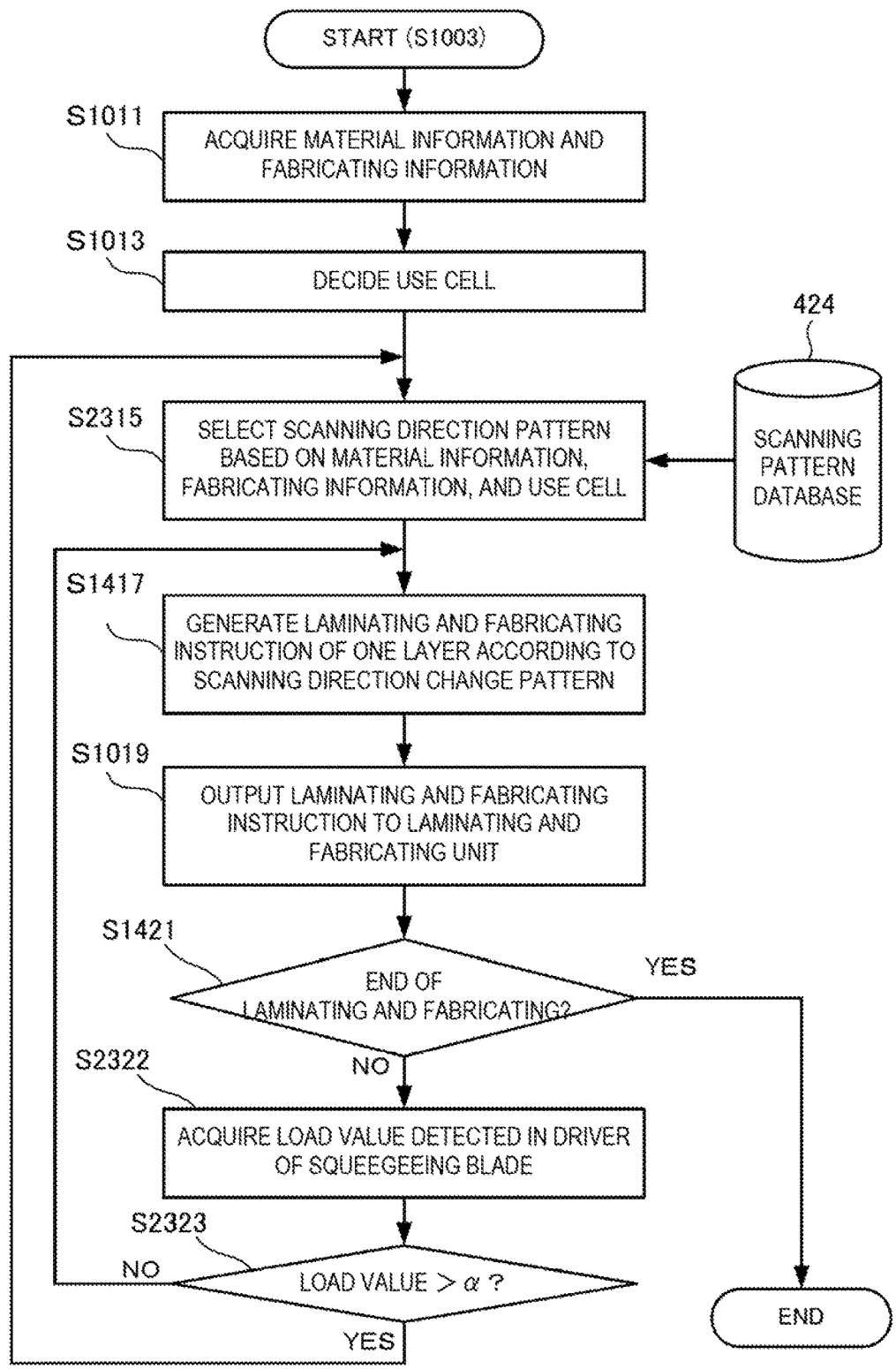
FIG. 23 is a flowchart showing the procedure of laminating and fabricating instruction generation processing according to the fifth embodiment of the present invention.

FIG. 23 is a flowchart showing the procedure of laminating and fabricating instruction generation processing (step S1003) according to this embodiment. Note that the same step numbers as in FIG. 10B or 14 denote the same steps in FIG. 23, and a repetitive description will be omitted.

In step S2315, the laminating and fabricating controller 2020 selects one scanning pattern.

If the laminating and fabricating of the three-dimensional fabricated object does not end in step S1421, in step S2322, the laminating and fabricating controller 2020 acquires a load value detected in the driver of the squeegeeing blade 210. In step S2323, the laminating and fabricating controller 2020 determines whether the detected load value exceeds a threshold α. If the load value does not exceed the threshold α, the laminating and fabricating controller 2020 returns to step S1417 to generate the laminating and fabricating instruction of the next layer. If the load value exceeds the threshold α, the laminating and fabricating controller 2020 returns to step S2315 to select another scanning direction pattern after overload detection.

Note that in this embodiment, an example in which the load detector 2011 is included in the laminating and fabricating unit 2010 has been described. However, the load detector may be wholly or partially included in the laminating and fabricating controller 2020.

According to this embodiment, upon detecting an overload in the driver of the squeegeeing blade, the scanning direction of the irradiator with respect to the moving direction of the squeegeeing blade is changed, thereby efficiently suppressing, in advance, the squeegeeing blade from getting caught on a surface of the laminated and fabricated object.

[Sixth Embodiment]

Laminating and fabricating by a three-dimensional laminating and fabricating system according to the sixth embodiment of the present invention will be described next. The three-dimensional laminating and fabricating system according to this embodiment is different from the second to fifth embodiments in that the scanning direction of a laminating material in a cell region by an irradiator is predicted based on three-dimensional fabricating data and changed for each cell region, and additionally, the scanning direction of a cell region by the irradiator is changed upon detecting an overload in the driver of a squeegeeing blade. The rest of the components and operations is the same as in the second to fifth embodiments. Hence, the same reference numerals denote the same components and operations, and a detailed description thereof will be omitted.

«Functional Arrangement of Laminating and Fabricating Controller»

Figure 24:
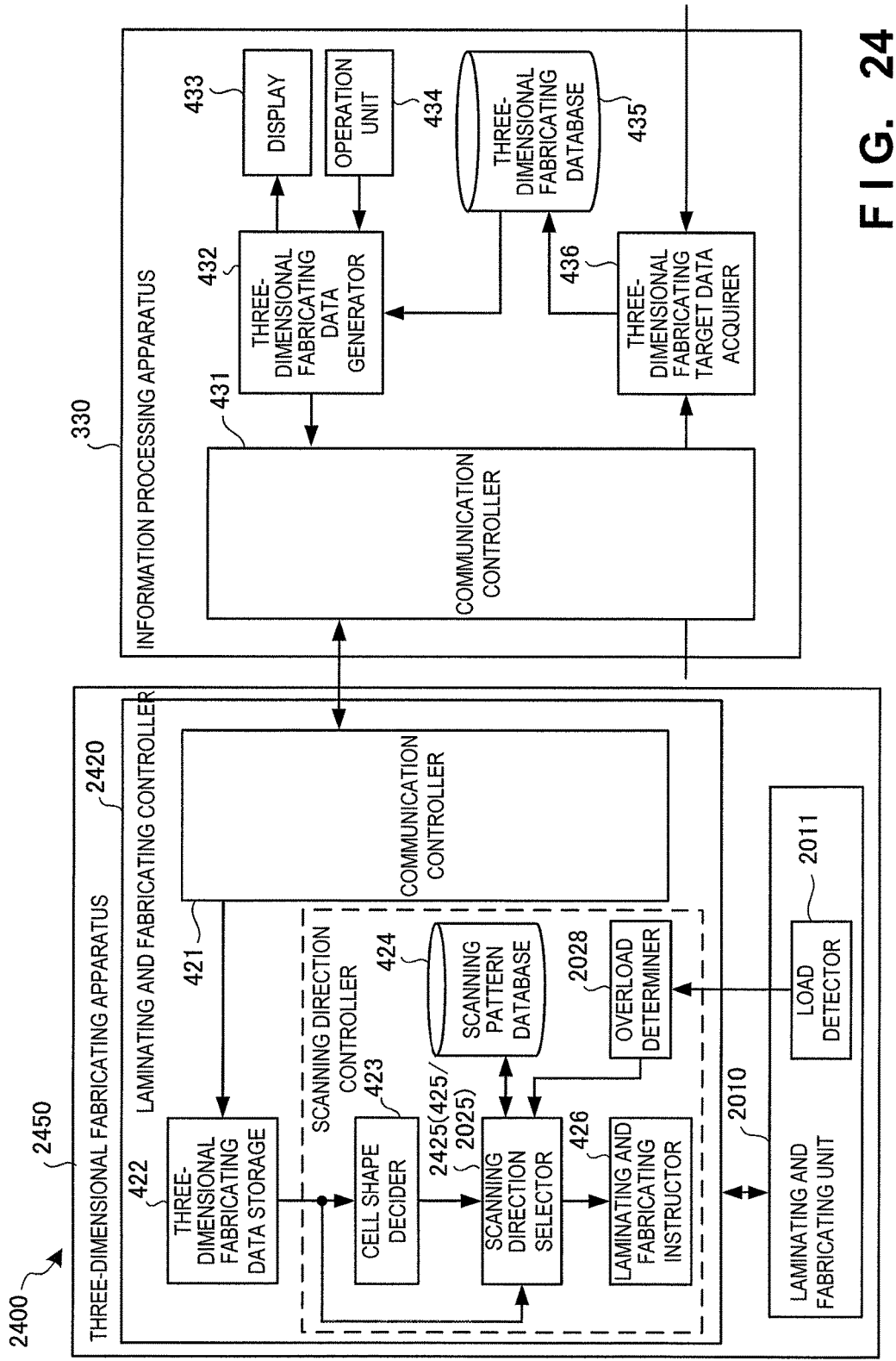
FIG. 24 is a block diagram showing the functional arrangement of a laminating and fabricating controller in a three-dimensional laminating and fabricating system according to the sixth embodiment of the present invention.

FIG. 24 is a block diagram showing the functional arrangement of a laminating and fabricating controller 2420 in a three-dimensional laminating and fabricating system 2400 according to this embodiment. Note that the same reference numerals as in FIG. 4 or 20 denote the same functional components in FIG. 24, and a repetitive description will be omitted. FIG. 24 shows a three-dimensional fabricating apparatus 2450 including the laminating and fabricating controller 2420.

A scanning direction selector 2425 has both the function of the scanning direction selector 425 in FIG. 4 and the function of the scanning direction selector 2025 in FIG. 20 in laminating and fabricating. That is, change of the scanning directions of the cell regions is decided by performing prediction. On the other hand, upon determining an overload, the predicted change of the scanning directions of the cell regions is interrupted, and control is shifted to newly predicted change of the scanning directions of the cell regions.

(Laminating and Fabricating Instruction Generation Processing)

Figure 25:
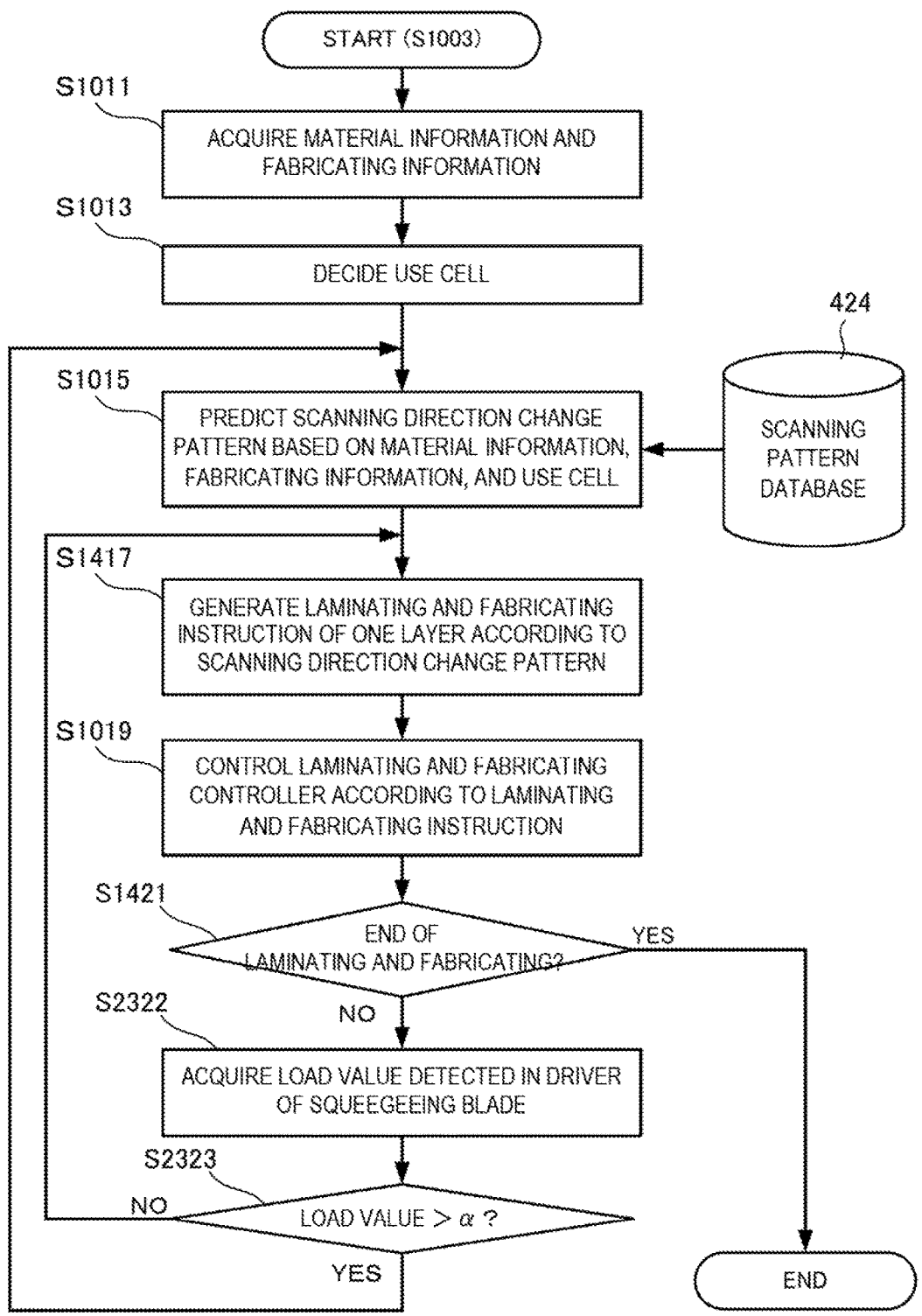
FIG. 25 is a flowchart showing the procedure of laminating and fabricating instruction generation processing according to the sixth embodiment of the present invention.

FIG. 25 is a flowchart showing the procedure of laminating and fabricating instruction generation processing (step S1003) according to this embodiment. Note that the same step numbers as in FIG. 10B, 14, or 23 denote the same steps in FIG. 25, and a repetitive description will be omitted.

In step S2323, the laminating and fabricating controller 2420 determines whether the detected load value exceeds a threshold α. If the load value does not exceed the threshold α, the laminating and fabricating controller 2420 returns to step S1417 to generate the laminating and fabricating instruction of the next layer. If the load value exceeds the threshold α, the laminating and fabricating controller 2420 returns to step S1015 to shift to newly predicted change of the scanning directions of the cell regions.

According to this embodiment, the scanning direction of the irradiator with respect to the moving direction of the squeegeeing blade is predicted based on three-dimensional fabricating data, and upon detecting an overload in the driver of the squeegeeing blade, the scanning direction of the irradiator is changed, thereby reliably suppressing, in advance, the squeegeeing blade from getting caught on a surface of the laminated and fabricated object.

[Seventh Embodiment]

Laminating and fabricating by a three-dimensional laminating and fabricating system according to the seventh embodiment of the present invention will be described next. The three-dimensional laminating and fabricating system according to this embodiment is different from the second to sixth embodiments in that three-dimensional fabricating data is generated in consideration of a change in the scanning direction of a laminating material in a cell region by an irradiator, and the scanning direction of a cell region by the irradiator is changed. The rest of the components and operations is the same as in the second to sixth embodiments. Hence, the same reference numerals denote the same components and operations, and a detailed description thereof will be omitted.

«Functional Arrangement of Information Processing Apparatus»

Figure 26:
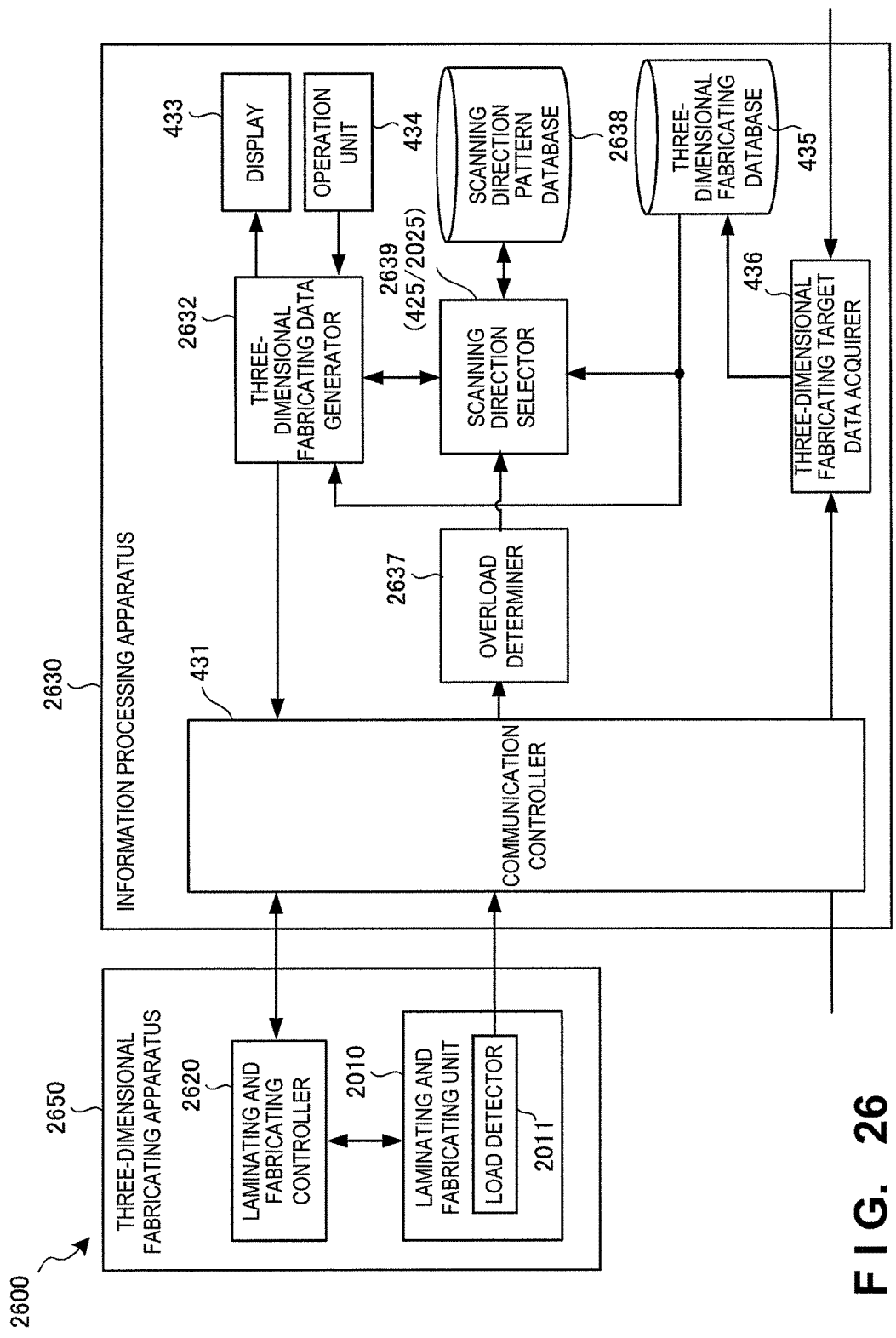
FIG. 26 is a block diagram showing the functional arrangement of an information processing apparatus in a three-dimensional laminating and fabricating system according to the seventh embodiment of the present invention.

FIG. 26 is a block diagram showing the functional arrangement of an information processing apparatus 2630 in a three-dimensional laminating and fabricating system 2600 according to this embodiment. Note that the same reference numerals as in FIG. 4 or 20 denote the same functional components in FIG. 26, and a description thereof will be omitted.

A laminating and fabricating controller 2620 of a three-dimensional fabricating apparatus 2650 does not have a function of changing the scanning directions in the cell regions, and only controls to do irradiation in a scanning direction based on three-dimensional fabricating data received from the information processing apparatus 2630.

The information processing apparatus 2630 includes a three-dimensional fabricating data generator 2632, an overload determiner 2637, a scanning direction pattern database 2638, and a scanning direction selector 2639. The three-dimensional fabricating data generator 2632 generates three-dimensional fabricating data including the information of the scanning directions in the cell regions predicted by the scanning direction selector 2630. If a load value transmitted from a load detector 2011 in a laminating and fabricating unit 2010 exceeds a threshold, the overload determiner 2637 notifies an overload. The scanning direction pattern database 2638 accumulates the history of scanning patterns as combinations of scanning directions in cell regions, which are suitably used without making a squeegeeing blade 210 get caught on a surface of a fabricated object, based on three-dimensional fabricating data, the characteristics of the three-dimensional fabricating apparatus, and the laminating and fabricating conditions, like the scanning pattern database 424 in FIG. 4. The scanning direction selector 2639 predicts the scanning directions in the cell regions based on the three-dimensional fabricating target data of the three-dimensional fabricated object, the scanning direction pattern of the history accumulated in the scanning direction pattern database 2638, and the overload notification. Note that the overload determiner 2637 is an option and need not always be included.

(Processing Procedure of Information Processing Apparatus)

Figure 27:
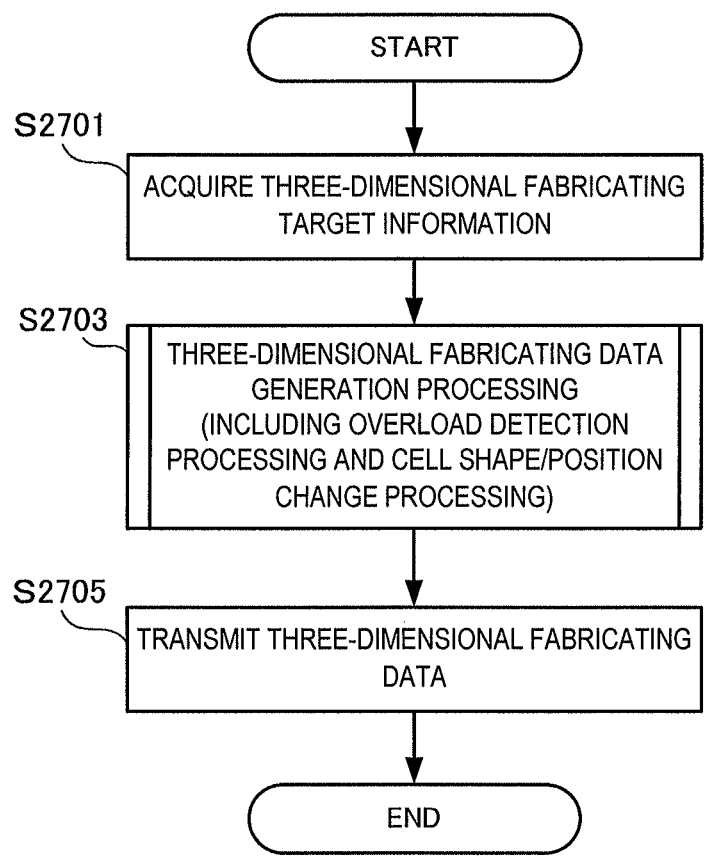
FIG. 27 is a flowchart showing the processing procedure of the information processing apparatus according to the seventh embodiment of the present invention.

FIG. 27 is a flowchart showing the processing procedure of the information processing apparatus 2630 according to this embodiment.

In step S2701, the information processing apparatus 2630 acquires three-dimensional fabricating target information. In step S2703, the information processing apparatus 2630 executes three-dimensional fabricating data generation processing including overload detection processing, cell shape or position change processing, and the like. Note that the three-dimensional fabricating data generation processing can be assumed from FIG. 10B in which three-dimensional fabricating data includes the information of change of scanning directions in cell regions, and a repetitive description will be omitted. In step S2705, the information processing apparatus 2630 transmits the generated three-dimensional fabricating data to the laminating and fabricating controller 2620 of the three-dimensional fabricating apparatus 2650.

The laminating and fabricating controller 2620 controls the laminating and fabricating unit 2010 in accordance with the received three-dimensional fabricating data to laminate and fabricate the three-dimensional fabricated object without making the squeegeeing blade 210 get caught on a surface of the fabricated object.

According to this embodiment, three-dimensional fabricating data is generated in consideration of a change of the scanning direction of a laminating material in a cell region by the irradiator, and the scanning directions in the cell regions by the irradiator are changed, thereby suppressing, in advance, the squeegeeing blade from getting caught on a surface of the laminated and fabricated object without the change of the three-dimensional fabricating apparatus.

[Eighth Embodiment]

Laminating and fabricating by a three-dimensional laminating and fabricating system according to the eighth embodiment of the present invention will be described next. The three-dimensional laminating and fabricating system according to this embodiment is different from the second to seventh embodiments in that another processing is combined if changing the laser scanning direction is insufficient as a measure against an overload. The rest of the components and operations is the same as in the second to seventh embodiments. Hence, the same reference numerals denote the same components and operations, and a detailed description thereof will be omitted.

(Processing Procedure of Information Processing Apparatus)

Figure 28:
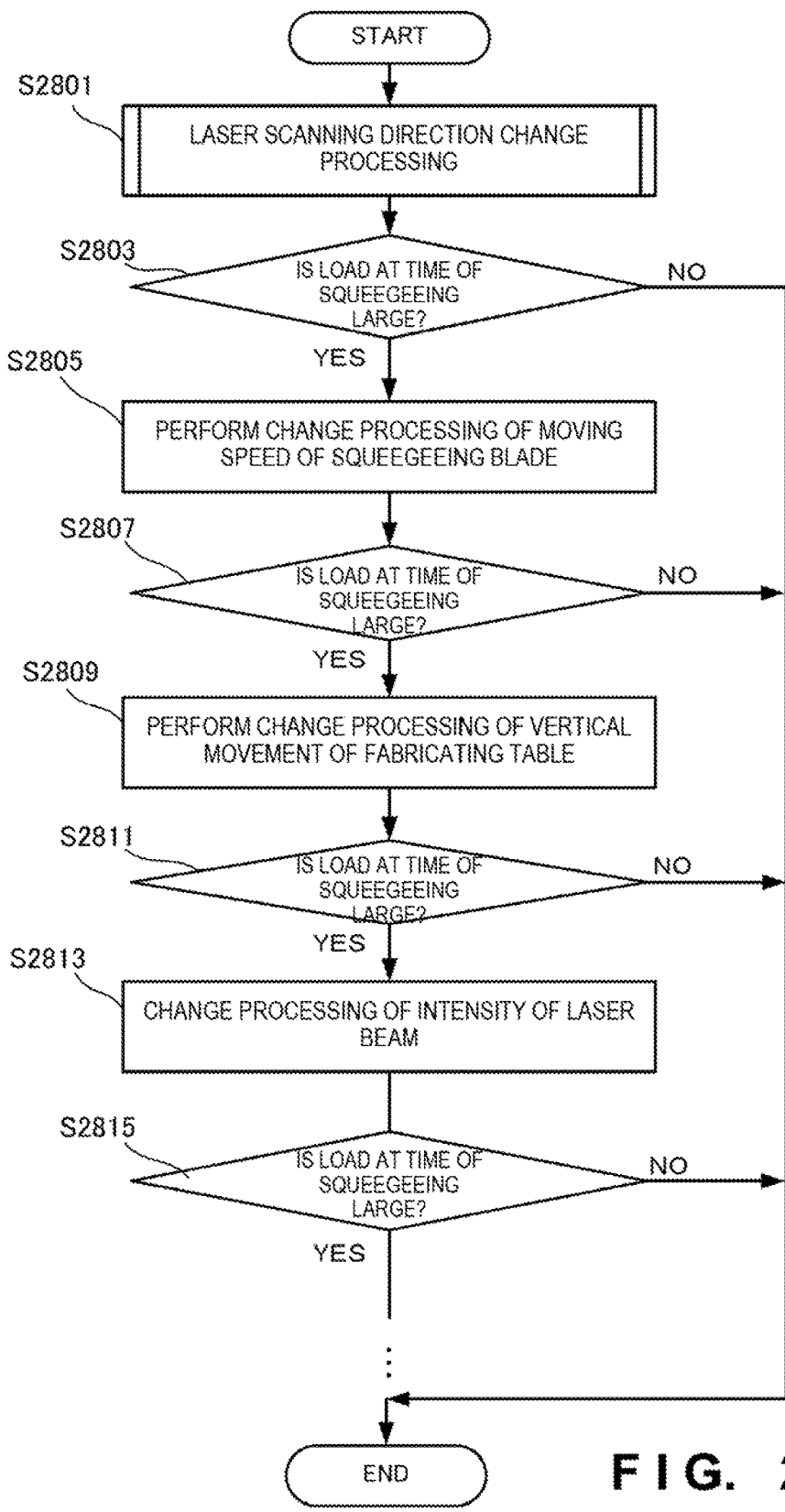
FIG. 28 is a flowchart showing the processing procedure of an information processing apparatus according to the eight embodiment of the present invention.

FIG. 28 is a flowchart showing the processing procedure of an information processing apparatus according to this embodiment.

In step S2801, the information processing apparatus executes at least one of the laser scanning direction changing processes described in the first to seventh embodiments. In step S2803, the information processing apparatus measures the load at the time of squeegeeing, and determines whether the load is large, or load reduction is insufficient.

If the load is large, or load reduction is insufficient, the information processing apparatus performs changing processing of the moving speed of the squeegeeing blade in step S2805. In step S2807, the information processing apparatus measures the load at the time of squeegeeing, and determines whether the load is large, or load reduction is insufficient.

If the load is large, or load reduction is insufficient, the information processing apparatus performs changing processing of the vertical movement of the fabricating table in step S2809. In step S2811, the information processing apparatus measures the load at the time of squeegeeing, and determines whether the load is large, or load reduction is insufficient.

If the load is large, or load reduction is insufficient, the information processing apparatus performs changing processing of the intensity of the laser beam in step S2813. In step S2815, the information processing apparatus measures the load at the time of squeegeeing, and determines whether the load is large, or load reduction is insufficient. From then on, if the load is large, or load reduction is insufficient, the information processing apparatus may perform another processing of reducing the load.

Note that in FIG. 28, as for the priority order of the processes of preventing an overload, the processes are performed in the order of change of the laser scanning direction→change of the moving speed of the squeegeeing blade→change of the vertical movement of the fabricating table→change of the intensity of the laser beam. However, the priority order of the change processing of the moving speed of the squeegeeing blade, the change processing of the vertical movement of the fabricating table, and the change processing of the intensity of the laser beam is not limited to FIG. 28. An appropriate process or a combination of appropriate processes is selected out of these processes based on load prediction by a material or the like, a current load variation, or the like.

For example, in the change of the moving speed of the squeegeeing blade, if the load is close to the overload, the moving speed may be reduced so the load does not exceed the overload. If the load is far from the overload, the moving speed may be increased to shave and planarize the surface of the laminated and fabricated object. In the change processing of the vertical movement of the fabricating table, if the load is close to the overload, the lowering distance may be increased so the load does not exceed the overload. If the load is far from the overload, the lowering distance may be shortened to shave and planarize the surface of the laminated and fabricated object. In the change processing of the intensity of the laser beam, if the load is close to the overload, the intensity of the laser beam may be reduced so the load does not exceed the overload. If the load is far from the overload, the intensity of the laser beam may be increased to increase the fabricating speed of the laminated and fabricated object.

According to this embodiment, in a case in which the overload at the time of squeegeeing is likely to occur even if the laser scanning direction is changed, another processing is combined, thereby preventing fabricating of the laminated and fabricated object from stopping due to an overload.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and fabricating system comprising:
   a laminating and fabricating unit that includes a squeegeeing blade configured to spread a laminating material on an upper layer of a laminated and fabricated object, and an irradiator configured to irradiate the laminating material, said laminating and fabricating unit fabricating each layer of the laminated and fabricated object, the each layer comprising an aggregate of cell regions; and
   a laminating and fabricating controller configured to control said laminating and fabricating unit such that a scanning direction in which said irradiator irradiates the laminating material while scanning in each of the cell regions changes with respect to a moving direction represented by a vector of said squeegeeing blade during laminating and fabricating, wherein the scanning direction is selected from directions having acute angles with respect to the moving direction of said squeegeeing blade, wherein the laminating and fabricating controller includes a scanning direction controller comprising an accumulator that accumulates laminating and fabricating conditions and a history of changes in the scanning direction in association with each other, and a selector that selects the changes in the scanning direction during laminating and fabricating based on the laminating and fabricating conditions, wherein the laminating and fabricating conditions include the laminating material, characteristics of the laminating and fabricating unit and features of data of the laminated and fabricated object.

2. A method of three-dimensional laminating and fabricating, comprising:

fabricating each layer of a laminated and fabricated object, the each layer comprising an aggregate of cell regions, using a laminating and fabricating unit that includes a squeegeeing blade configured to spread a laminating material on an upper layer of the laminated and fabricated object, and an irradiator configured to irradiate the laminating material; and controlling the laminating and fabricating unit such that a scanning direction in which the irradiator irradiates the laminating material while scanning in each of the cell regions changes with respect to a moving direction represented by a vector of the squeegeeing blade during laminating and fabricating, wherein the scanning direction is selected from directions having acute angles with respect to the moving direction of said squeegeeing blade, wherein, in the controlling the laminating and fabricating unit, laminating and fabricating conditions and a history of changes in the scanning direction are accumulated in association with each other, and the changes in the scanning direction during laminating and fabricating are selected based on the laminating and fabricating conditions, wherein the laminating and fabricating conditions include the laminating material, characteristics of the laminating and fabricating unit and features of data of the laminated and fabricated object.

3. A laminating and fabricating control apparatus comprising:

a data acquirer that acquires data of a laminated and fabricated object as a target of laminating and fabricating; and a scanning direction controller configured to control, based on the data of the laminated and fabricated object, a laminating and fabricating unit fabricating each layer of the laminated and fabricated object, the each layer comprising an aggregate of cell regions, such that a scanning direction in which a laminating material while scanning in each of the cell regions is irradiated changes, during laminating and fabricating, with respect to a moving direction represented by a vector of a squeegeeing blade configured to spread the laminating material on an upper layer of the laminated and fabricated object, wherein the scanning direction is selected from directions having acute angles with respect to the moving direction of said squeegeeing blade, wherein said scanning direction controller comprises an accumulator that accumulates laminating and fabricating conditions and a history of changes in the scanning direction in association with each other, and a selector that selects the changes in the scanning direction during the laminating and fabricating based on the laminating and fabricating conditions, wherein the laminating and fabricating conditions include the laminating material, characteristics of the laminating and fabricating unit and features of the data of the laminated and fabricated object.

4. The laminating and fabricating control apparatus according to claim 3, wherein said scanning direction controller is configured to control the laminating and fabricating unit such that the scanning direction changes with respect to the moving direction of said squeegeeing blade in the each layer.

5. The laminating and fabricating control apparatus according to claim 3, wherein said scanning direction controller is configured to control the laminating and fabricating unit such that the scanning direction changes, every laminated layer counts, with respect to the moving direction of said squeegeeing blade.

6. The laminating and fabricating control apparatus according to claim 5, wherein said scanning direction controller is configured to change, every laminated layer counts, a position of each of the cell regions, to control such that the scanning direction changes with respect to the moving direction of said squeegeeing blade.

7. The laminating and fabricating control apparatus according to claim 3, wherein said scanning direction controller is configured to change a shape of each of the cell regions with respect to the moving direction of said squeegeeing blade, to control such that the scanning direction changes with respect to the moving direction of said squeegeeing blade.

8. The laminating and fabricating control apparatus according to claim 3, wherein, when a load on moving said squeegeeing blade exceeds a threshold, said scanning direction controller is configured to control the laminating and fabricating unit such that the scanning direction during the laminating and fabricating changes with respect to the moving direction of said squeegeeing blade.

9. The laminating and fabricating control apparatus according to claim 3, wherein said scanning direction controller comprises:

a unit that acquires the data of the laminated and fabricated object as the target of laminating and fabricating; and a unit that generates, based on the data of the laminated and fabricated object, three-dimensional fabricating data used to control said laminating and fabricating unit in consideration of a change in the scanning direction.

10. The laminating and fabricating control apparatus according to claim 3, wherein said scanning direction controller is further configured to control said laminating and fabricating unit so as to perform at least one of change of a moving speed of said squeegeeing blade, change of a vertical movement of a fabricating table, and change of an intensity of a laser beam.

11. A method of controlling a laminating and fabricating control apparatus, comprising:

acquiring data of a laminated and fabricated object as a target of laminating and fabricating; and controlling, based on the data of the laminated and fabricated object, a laminating and fabricating unit fabricating each layer of the laminated and fabricated object, the each layer comprising an aggregate of cell regions, such that a scanning direction in which a laminating material while scanning in each of the cell regions is irradiated changes, during laminating and fabricating, with respect to a moving direction represented by a vector of a squeegeeing blade configured to spread the laminating material on an upper layer of the laminated and fabricated object, wherein the scanning direction is selected from directions having acute angels with respect to the moving direction of said squeegeeing blade, wherein, in the controlling the laminating and fabricating unit, laminating and fabricating conditions and a history of changes in the scanning direction are accumulated in association with each other, and the changes in the scanning direction during the laminating and fabricating are selected based on the laminating and fabricating conditions, wherein the laminating and fabricating conditions include the laminating material, characteristics of the laminating and fabricating unit and features of the data of the laminated and fabricated object.

12. A non-transitory computer-readable storage medium storing a control program of a laminating and fabricating control apparatus, which causes a computer to execute a method, comprising:

acquiring data of a laminated and fabricated object as a target of laminating and fabricating; and controlling, based on the data of the laminated and fabricated object, a laminating and fabricating unit fabricating each layer of the laminated and fabricated object, the each layer comprising an aggregate of cell regions, such that a scanning direction in which a laminating material while scanning in each of the cell regions is irradiated changes, during laminating and fabricating, with respect to a moving direction represented by a vector of a squeegeeing blade configured to spread the laminating material on an upper layer of the laminated and fabricated object, wherein the scanning direction is selected from directions having acute angles with respect to the moving direction of said squeegeeing blade, wherein, in the controlling the laminating and fabricating unit, laminating and fabricating conditions and a history of changes in the scanning direction are accumulated in association with each other, and the changes in the scanning direction during the laminating and fabricating are selected based on the laminating and fabricating conditions, wherein the laminating and fabricating conditions include the laminating material, characteristics of the laminating and fabricating unit and features of the data of the laminated and fabricated object.

* * * * *